United States Patent
Kim

(10) Patent No.: US 12,008,532 B2
(45) Date of Patent: Jun. 11, 2024

(54) PAYMENT AND CHARGING SYSTEMS AND METHODS USING A MEDIUM AND INTERNET SITES

(71) Applicant: Geum-Cheol Kim, Uiwang-si (KR)

(72) Inventor: Geum-Cheol Kim, Uiwang-si (KR)

(*) Notice: Subject to any disclaimer, the term of this patent is extended or adjusted under 35 U.S.C. 154(b) by 0 days.

(21) Appl. No.: 17/178,002

(22) Filed: Feb. 17, 2021

(65) Prior Publication Data
US 2021/0174326 A1 Jun. 10, 2021

Related U.S. Application Data

(63) Continuation of application No. PCT/KR2019/010504, filed on Aug. 19, 2019.

(30) Foreign Application Priority Data

Aug. 17, 2018 (KR) .................. 10-2018-0095861

(51) Int. Cl.
*G06Q 20/20* (2012.01)
*G06Q 20/40* (2012.01)

(52) U.S. Cl.
CPC ....... *G06Q 20/202* (2013.01); *G06Q 20/4014* (2013.01)

(58) Field of Classification Search
CPC .. G06Q 20/202; G06Q 20/4014; G06Q 20/10; G06Q 20/204; G06Q 20/349;
(Continued)

(56) References Cited

U.S. PATENT DOCUMENTS 10,204,327 B2* 2/2019 Katzin ............... G06Q 20/4016
10,223,691 B2* 3/2019 Katzin ............... G06Q 30/0623
(Continued)

FOREIGN PATENT DOCUMENTS

KR 10-2014-0016505 A 2/2014
KR 10-2015-0103420 A 9/2015
(Continued)

OTHER PUBLICATIONS

International Search Report and Written Opinion dated Dec. 5, 2029 in International Application No. PCT/KR2019/010504, in 12 pages. (English translation of ISR in 2 pages.).

*Primary Examiner* — Michael Jared Walker
(74) *Attorney, Agent, or Firm* — Shih IP Law Group, PLLC.

(57) ABSTRACT

Not using any app, a URL medium including a vault URL containing a property of an ID of a user is used during a user confirmation process and a transaction request process (a payment request process or a charging request process), and transaction (a payment or a charging) is made using money from an external device (a URL vault account), not the URL medium. A URL medium can support a way of requesting a transaction (a payment or a charging) after checking a user, or can support a way of confirming a user after requesting a transaction (a payment or a charging). A URL medium can support offline transactions and online transactions, and two URL medium (a URL medium-B of a buyer and a URL medium-S of a seller) can support offline transactions that do not use a POS (a URL POS). A URL medium can also support transactions that temporarily approve a payment.

6 Claims, 27 Drawing Sheets

(58) Field of Classification Search
CPC .... G06Q 20/36; G06Q 20/387; G06Q 20/085; G06Q 20/353; G06F 16/9566
See application file for complete search history.

(56) References Cited

U.S. PATENT DOCUMENTS

| | | | |
|---|---|---|---|
| 10,586,227 B2* | 3/2020 | Makhdumi | G06Q 20/3276 |
| 10,853,797 B2* | 12/2020 | Hammad | G06Q 20/3227 |
| 2013/0024371 A1* | 1/2013 | Hariramani | G06Q 20/384 |
| | | | 705/41 |
| 2015/0317751 A1* | 11/2015 | Kalyvas | G06Q 30/0269 |
| | | | 705/14.16 |
| 2016/0019536 A1* | 1/2016 | Ortiz | G06Q 20/36 |
| | | | 705/67 |
| 2018/0006831 A1* | 1/2018 | Toll | H04L 9/0618 |
| 2019/0034921 A1* | 1/2019 | Hammad | G06Q 20/3276 |
| 2019/0080392 A1* | 3/2019 | Youb | G06Q 20/401 |
| 2021/0056535 A1* | 2/2021 | Xu | H04W 4/50 |

FOREIGN PATENT DOCUMENTS

| | | |
|---|---|---|
| KR | 10-2015-0127947 A | 11/2015 |
| KR | 10-2016-0064061 A | 6/2016 |
| KR | 10-2017-0060720 A | 6/2017 |
| KR | 10-1751640 B1 | 6/2017 |
| KR | 10-1941587 B1 | 4/2019 |

* cited by examiner

<The dotted line represents the credit card network.>

PAYMENT AND CHARGING SYSTEMS AND METHODS USING A MEDIUM AND INTERNET SITES

CROSS-REFERENCE TO RELATED APPLICATIONS

This is a continuation application of International Patent Application No. PCT/KR2019/010504, filed on Aug. 19, 2019, which claims priority to Korean Patent Application No. 10-2018-0095861 filed on Aug. 17, 2018, contents of both of which are incorporated herein by reference in their entireties.

BACKGROUND

Technical Field

The present invention relates to a payment or charging system and method, using a medium, etc.

Description of Related Technology (Types and overview of a payment) There are a RF card payment, a URL-NFC CC {refer to Korean Patent 10-2016-0063699 (KR No. 10-1751640) or 10-2017-0096573 (KRNo. 10-1941587)} payment, an App&SP (a smart phone with an app) payment, etc., and examples of an App&SP payment can include Alipay and WeChat Pay. For these payments, a system and a method combining a medium and a way storing money is different. For these payments, a medium and a way storing money is also different each other.

SUMMARY

One aspect is a simpler and more economical means of payment or charging.

Another aspect is a payment or charging method applicable to a wider variety of transactions.

Another aspect is a payment or charging method capable of structurally blocking hacking.

Another aspect is a payment or charging method that can support additional services more economically.

Another aspect is a face-to-face transaction payment method and system without a user confirmation (e.g., refer to FIG. 5 or 6). This is a system and method in which a uniform resource locator (URL) medium, a user, a URL point of sale (POS), a VS, a URL vault account, a collection account, a payment request, a vault URL, URL POS info, a payment command, money, a payment command result, or a payment result, etc. operate organically. The system and method pays with money being in an external device rather than the URL medium using the URL medium and the Internet site.

Another aspect is a payment method and system in a face-to-face transaction that confirms a user after requesting a payment (e.g., refer to FIG. 7 or 8). This is a system and method in which a URL medium, a user, a URL POS, a TD, a VS, a URL vault account, a collection account, a payment request, a vault URL, URL POS info, a vault site, TD info, a vault URL PWD, a vault URL PWD check result, order details, an order confirmation, a payment command, money, a payment command result, or a payment result, etc. operate organically. The system and method pays with money being in an external device rather than the URL medium using the URL medium and the Internet site.

Another aspect is a payment method and system for a face-to-face transaction requesting a payment after confirming a user (e.g., refer to FIG. 9 or 10). This is a system and method in which a URL medium, a user, a TD, a URL POS, a VS, a URL vault account, a collection account, a vault URL, a vault site, TD info, a vault URL PWD, a vault URL PWD check result, a payment reservation, a payment request, URL POS info, a payment command, money, a payment command result, or a payment result, etc. operate organically. The system and method pays with money being in an external device rather than the URL medium using the URL medium and the Internet site.

Another aspect is a payment method and system for a non-face-to-face transaction confirming a user after requesting a payment (e.g., refer to FIG. 11 or 12). This is a system and method in which a URL medium, a user, a TD, an SS, a VS, a URL vault account, a collection account, an SS access command, a sales site, a payment request, an Order #, SS info, a vault URL, a vault site, TD info, a vault URL PWD, a vault URL PWD check result, order details, an order confirmation, a payment command, money, a payment command result, or a payment result, etc. operate organically. The system and method pays with money being in an external device rather than the URL medium using the URL medium and the Internet site.

Another aspect is a payment method and system for an non-face-to-face transaction requesting a payment after confirming a user (e.g., refer to FIG. 13 or 14). This is a system and method in which a URL medium, a user, a TD, an SS, a VS, a URL vault account, a collection account, a vault URL, a vault site, TD info, a vault URL PWD, a vault URL PWD check result, a payment reservation, a SS access command, a sales site, a payment request, SS info, a payment command, money, a payment command result, or a payment result, etc. operate organically. The system and method pays with money being in an external device rather than the URL medium using the URL medium and the Internet site.

Another aspect is a payment method and system for face-to-face transactions using two URL mediums without confirming a user (e.g., refer to FIG. 15 or 16). This is a system and method in which a URL medium-B, a URL medium-S, a user-B, a TD, a VS, a URL vault-B account, a collection account-S, a vault URL-B, a vault site-B, TD info, a payment request, a vault URL-S, a payment command, money, a payment command result, or a payment result, etc. operate organically. The system and method pays with money being in an external device rather than the URL medium-B using the two URL mediums and the Internet site.

Another aspect is a payment method and system for face-to-face transactions using two URL mediums, identifying a user (e.g., refer to FIG. 17 or 18). This is a system and method in which a URL medium-B, a URL medium-S, a user-B, a TD, a VS, a URL vault-B account, a collection account-S, a vault URL-B, a vault site-B, TD info, a vault URL-B PWD, a vault URL-B PWD check result, a payment request, a vault URL-S, a payment command, money, a payment command result, or a payment result, etc. operate organically. The system and method pays with money being in an external device rather than the URL medium-B using the two URL mediums and the Internet site.

Another aspect is a payment method and system for face-to-face transaction through a provisional payment (e.g., refer to FIG. 19 or 20). This is a system and method in which a URL medium, a user, a URL POS, a payment request, a vault URL, or a payment result, etc. operate organically. The system and method use the URL medium to pay with money being in an external device rather than the URL medium, and the type of the payment is the provisional payment (=temporarily approved payment).

Another aspect is a non-face-to-face charging method and system after confirming a user (e.g., refer to FIG. 21 or 22). This is a system and method in which a URL medium, a user, a TD, a VS, a money supplier, a URL vault account, a vault URL, a vault site, a vault URL PWD, a vault URL PWD check result, a charge request, a charge order, money, a charge order result, or a charge result, etc. operate organically. In the system and method, the URL vault account, which is not a medium (the URL medium), can store money using the URL medium and the Internet site.

Another aspect is a face-to-face charging method and system in which money is paid to a third party and the third party performs charging as an agent (e.g., refer to FIG. 23 or 24) This is a system and method in which a URL medium, a user, a URL POS, a VS, a money supplier, a URL vault account, a charge agency request, a vault URL, URL POS info, a charge order, money, a charge order result, or a charge agency result, etc. operate organically. In the system and method, the URL vault account, which is not a medium (=the URL medium), can store money using the URL medium and the Internet site.

Another aspect is a face-to-face charging method and system where a URL vault account can be charged with a coupon generated by transaction, etc. (e.g., refer to FIG. 25 or 26). This is a system and method in which a URL medium, a user, a URL POS, a VS, a URL vault account, a coupon charge request, a vault URL, URL POS info, a coupon, or a coupon charge result, etc. operate organically. In the system and method, the URL vault account, which is not a medium (=the URL medium), can store a coupon using the URL medium and the Internet site.

Another aspect is a non-face-to-face charging method and system where a URL vault account can be charged with a coupon generated by transaction, etc. (e.g., refer to FIG. 27 or 28). This is a system and method in which a URL medium, a user, a TD, a SS, a VS, a URL vault account, a coupon charge request, URL medium info, SS info, a coupon, or a coupon charge result, etc. operate organically. In the system and method, the URL vault account, which is not a medium (=the URL medium), can store a coupon using the medium and the Internet site.

Another aspect is an electronic payment system and method, comprising: a URL medium that can store a vault URL, etc., and deliver the vault URL to a URL POS; the URL POS that can receive a payment request, etc. from a user, receive the vault URL from the URL medium, connect to a VS in response to the vault URL, deliver URL POS info, or the payment request, etc. to the VS, and deliver a payment result, etc. received from the VS to the user; the VS that can connect to the URL POS in response to the vault URL, receive the URL POS info, or the payment request, etc. from the URL POS, deliver a payment command, etc. to a URL vault account, receive a payment command result, etc. from the URL vault account, and deliver the payment result, etc. to the URL POS; the URL vault account that can receive the payment command, etc. from the VS, deliver a money to a collection account, and deliver the payment command result, etc. to the VS; and the collection account that can collect the money.

Another aspect is an electronic payment method, comprising: step a) in which a URL POS receives a payment request, etc. from a user, receives a vault URL from a URL medium, connects to a VS in response to the vault URL, and delivers URL POS info, or the payment request, etc. to the VS; step b) in which the VS connects to the URL POS in response to the vault URL, and delivers a payment command, etc. to a URL vault account; step c) in which the URL vault account delivers a money to a collection account; and step d) in which the collection account collects the money; the URL vault account delivers a payment command result, etc. to the VS; the VS delivers a payment result, etc. to the URL POS; and the URL POS delivers the payment result, etc. to the user.

Another aspect is an electronic payment system and method, comprising: a URL medium-B that can store a vault URL-B, etc., and deliver the vault URL-B to a TD; a URL medium-S that can store a vault URL-S, etc., and deliver the vault URL-S to the TD; the TD that can receive the vault URL-B from the URL medium-B, connect to a VS or a vault site-B in response to the vault URL-B, deliver TD info, etc. to the VS, deliver a payment request, etc. received from a user-B to the VS, receive the vault URL-S from the URL medium-S, connect to the VS in response to the vault URL-S, and deliver a payment result, etc. received from the VS to the user-B; the VS that can connect to the TD in response to the vault URL-B, communicate the vault site-B, or the TD info, etc. with the TD, receive the payment request, etc. from the TD, connect to the TD in response to the vault URL-S, deliver a payment command, etc. to a URL vault-B account, receive a payment command result, etc. from the URL vault-B account, and deliver the payment result, etc. to the TD; the URL vault-B account that can receive the payment command, etc. from the VS, deliver a money to a collection account-S, and deliver the payment command result, etc. to the VS; and the collection account-S that can collect the money.

Another aspect is an electronic payment method, comprising: step a) in which a TD receives a vault URL-B from a URL medium-B, connects to a VS or a vault site-B in response to the vault URL-B, delivers TD info, etc. to the VS, and delivers a payment request, etc. received from a user-B to the VS; the VS manages the payment request, etc.; and the TD receives a vault URL-S from a URL medium-S and connects to the VS in response to the vault URL-S; step b) in which the VS delivers a payment command, etc. to a URL vault-B account; step c) in which the URL vault-B account delivers a money to a collection account-S; and step d) in which the collection account-S collects the money; the URL vault-B account delivers a payment command result, etc. to the VS; the VS delivers a payment result, etc. to the TD; and the TD delivers the payment result, etc. to the user-B.

Another aspect is an electronic charging system and method, comprising: a URL medium that can store a vault URL, etc., and deliver the vault URL to a TD; the TD that can receive the vault URL from the URL medium, connect to a VS or a vault site in response to the vault URL, deliver TD info, etc. to the VS, deliver a vault URL PWD, etc. received from a user to the VS, deliver a vault URL PWD check result, etc. received from the VS to the user, deliver a charge request, etc. received from the user to the VS, and deliver a charge result, etc. received from the VS to the user; the VS that can connect to the TD in response to the vault URL, communicate the vault site, or the TD info, etc. with the TD, receive the vault URL PWD, etc. from the TD, deliver the vault URL PWD check result, etc. to the TD, receive the charge request, etc. from the TD, deliver a charge order, etc. to a money supplier, receive a charge order result, etc. from the money supplier, and deliver the charge result, etc. to the TD; the money supplier that can receive the charge order, etc. from the VS, deliver a money to a URL vault account, and deliver the charge order result, etc. to the VS; and the URL vault account that can hold the money.

Another aspect is an electronic charging method, comprising: step a) in which a TD receives a vault URL from a URL medium, connects to a VS or a vault site in response to the vault URL, delivers TD info, etc. to the VS, and delivers a vault URL PWD, etc. received from a user to the VS; the VS delivers a vault URL PWD check result, etc. to the TD; and the TD delivers the vault URL PWD check result, etc. to the user and delivers a charge request, etc. received from the user to the VS; step b) in which the VS delivers a charge order, etc. to a money supplier; step c) in which the money supplier delivers a money to a URL vault account; and step d) in which the URL vault account holds the money; the money supplier delivers a charge order result, etc. to the VS; the VS delivers a charge result, etc. to the TD; and the TD delivers the charge result, etc. to the user.

Another aspect is an electronic charge agency system and method, comprising: a URL medium that can store a vault URL, etc., and deliver the vault URL to a URL POS; the URLPOS that can receive a charge agency request, etc. from a user, receive the vault URL from the URL medium, connect to a VS in response to the vault URL, deliver URL POS info, or the charge agency request, etc. to the VS, and deliver a charge agency result, etc. received from the VS to the user; the VS that can connect to the URL POS in response to the vault URL, receive the URL POS info, or the charge agency request, etc. from the URL POS, deliver a charge order, etc. to a money supplier, receive a charge order result, etc. from the money supplier, and deliver the charge agency result, etc. to the URL POS; the money supplier that can receive the charge order, etc. from the VS, deliver a money to a URL vault account, and deliver the charge order result, etc. to the VS; and the URL vault account that can hold the money.

Another aspect is an electronic charge agency method, comprising: step a) in which a URL POS receives a charge agency request, etc. from a user, receives a vault URL from a URL medium, connects to a VS in response to the vault URL, and delivers URL POS info, or the charge agency request, etc. to the VS; step b) in which the VS connects to the URL POS and delivers a charge order, etc. to a money supplier; step c) in which the money supplier delivers a money to a URL vault account; and step d) in which the URL vault account holds the money; the money supplier delivers a charge order result, etc. to the VS; the VS delivers a charge agency result, etc. to the URL POS; and the URL POS delivers the charge agency result, etc. to the user.

Another aspect is an electronic temporary payment system and method, comprising: a URL medium that can store a vault URL, etc., and deliver the vault URL to a URL POS; and the URL POS that can receive the vault URL from the URL medium, pay temporarily in response to the vault URL, store the vault URL, or a payment result, etc., and deliver the payment result, etc. to a user.

Another aspect is an electronic temporary payment method, comprising: step a) in which a URL medium delivers a vault URL to a URL POS; and step b) in which the URLPOS pays temporarily in response to the vault URL, stores the vault URL, or a payment result, etc., and delivers the payment result to a user.

The present invention can provide a simpler and more economical means of a payment or charging.

The present invention can also provide a simpler and more economical payment means or charging means applicable to various transactions.

The present invention can further provide a payment means or charging means that can structurally prevent hacking.

The present invention can further provide a payment method or a charging method that can further reduce fees.

The present invention can further provide a payment method or a charging method that can further create added value.

BRIEF DESCRIPTION OF THE DRAWINGS

(FIG. 4 can be the block diagram and flow chart of WeChat Pay or Alipay. FIG. 4 can be compared with FIG. 7 and FIG. 8 embodiments.)

Figure 1:
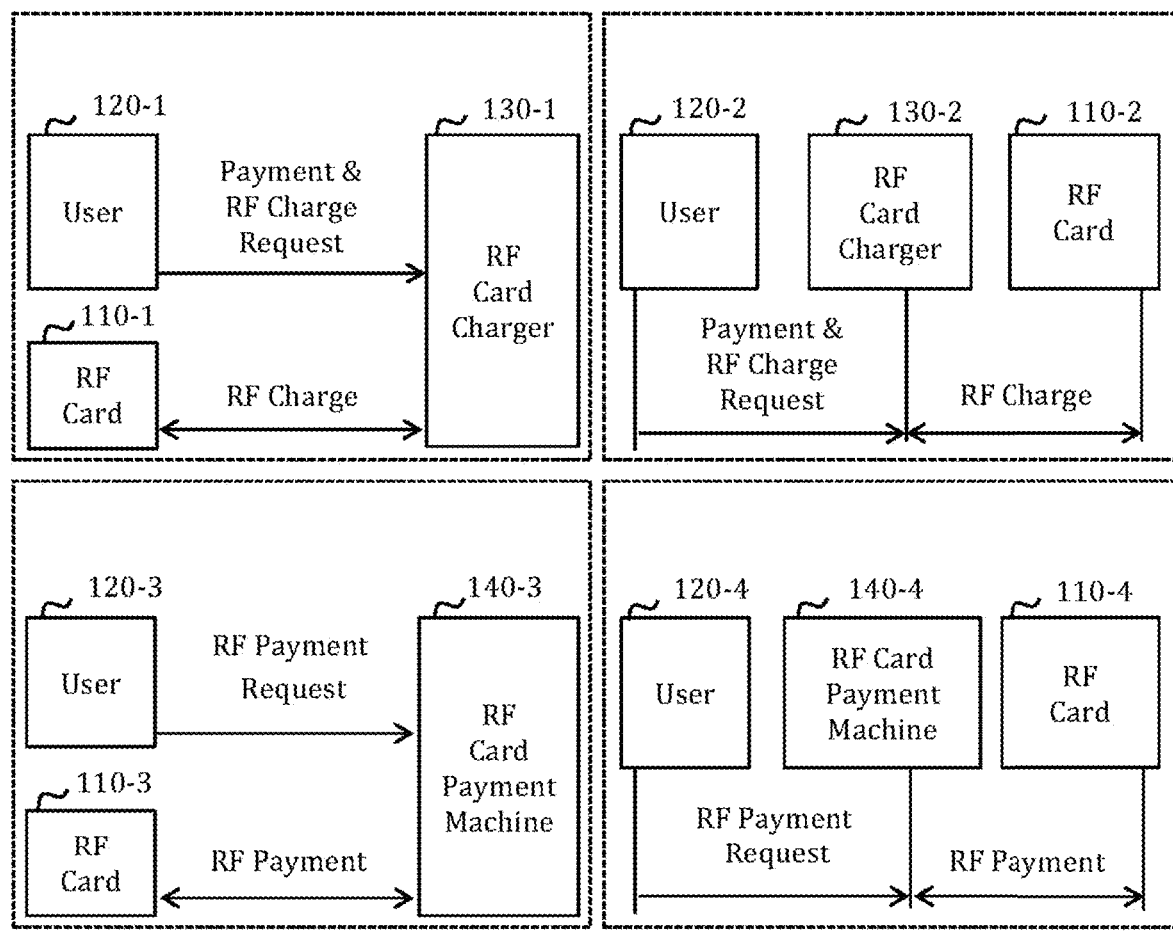
FIG. 1 is a block diagram and flow diagram of a system and method that an RF card can be charged with money and can pay with money stored in the RF card.

DETAILED DESCRIPTION (Definition and type of a medium) A medium is a device that a user owns and it stores information or means for payment or charging. A RF card, a URL-NFC CC and an App&SP are a kind of medium.

('storing money') For an RF card payment, money is stored in the RF card, and for a URL-NFC CC payment, money is stored in an external device (CC account) connected to a system that complies with the standard of credit card. In an App&SP payment, money is stored in an external device (App&SP account) connected to an App and a system using a mobile communication network.

(System and method for connecting medium and 'storing money') A RF card payment does not require a network. A URL-NFC CC payment is connected to a credit card network and the Internet. An App&SP payment connects a medium and 'storing money' using a smart phone equipped with an App, a USIM, and an App & mobile communication network.

(Credit card network) A credit card network is a communication network that combines a medium (URL-NFC CC), CC POS, and 'CCP server of CCC server of credit card company'. A URL-NFC CC, a CC POS, and a CCP server comply with the credit card standard.

(App & mobile communication network) An App & mobile communication network is a communication network that combines a medium (App&SP: Smart phone with App and USIM), an App POS, and an App server with mobile communication network.

(Types of payment paths, and relationships between a payment path and a medium) Payment paths can include a path tagging in face-to-face (RF card payment), a path using different communication networks (URL-NFC CC payment), a path incurring fees, a path requiring special devices, and a path using an internal operation of a medium and external communication networks (App&SP payment). Depending on the type of a medium, composition, cost, and competitiveness are different.

(Relationship between a payment process and a medium) A payment process can be divided into a payment request process, a user check process, and a remittance process. Depending on a medium, processes, order, and competitiveness of a payment are different.

(Relationship between 'types of a payment and a charging' and 'a medium') a) A face-to-face payment without a user confirmation, b) A face-to-face payment confirming a user after requesting a payment, c) A face-to-face payment requesting a payment after confirming a user, d) non-face-to-face transaction confirming a user after requesting a payment, e) A non-face-to-face payment requesting a payment after confirming a user, f) A face-to-face payment using two mediums without confirming a user, g) A face-to face payment using two mediums after confirming a user, h) A face-to-face payment approving temporarily a payment, i) A non-face-to-face charging which stores money after verifying a user, j) A face-to-face charging, in which a third party receives money from a user and stores the money instead of the user, k) A face-to-face charging, in which stores money (coupon) generated by transactions and the like, l) A non-face-to-face charging, in which stores money (coupon) generated by transactions and the like. Depending on a medium, the types of a payment and a charging is different and competitiveness of a payment or a charging is determined.

(A payment process by a medium) a) There is no a user check process for an RF card payment. A RF card payment requests a payment by tagging an RF card with an RF card payment machine, which means a payment request process. A RF card payment is made by deducting money of a RF card, which means a remittance process. b) for a payment of a URL-NFC CC, credit card information (CC info) is transferred to a CCP server of a credit card company through a credit card communication network (a payment request process), and a CC URL PWD and a CC URL are transferred to a CCW server of a credit card company (a user check process). A payment of a URL-NFC CC transfers money from an account (CC account) linked to a credit card network to another account (a remittance process). c) For an App&SP payment, an App&SP verifies a App PWD and generates a QR code (a user check process). For an App&SP payment, an App&SP delivers a QR code to an App Server via an App POS and an App& mobile communication network (a payment request process). For an App&SP payment, an App&SP transfers money from an account (App&SP account) linked to an App& mobile network to another account (a remittance process).

(An order of a payment request process and a user check process' by a medium) Since a RF card does not verify a user, there is no a user check process. A URL-NFC CC can change an order of a payment request process and a user check process. An App&SP can only execute a payment request process after executing a user check process.

Hereinafter, embodiments of the present invention are described in detail with reference to the accompanying drawings. The terms used herein should be interpreted not in typical or dictionary definitions but to comply in concept with the technical matters of the present invention.

The configurations disclosed in the specification and the drawings are mere examples and do not overall represent the technical spirit of the present invention. Therefore, various changes can be made thereto, and equivalents thereof also belong to the scope of the present invention.

URL (Uniform Resource Locator) is the location of a web document or a file in a web server that provides various services.

<A Charging and Payment of a Typical RF Card, Refer to FIG. 1>

(An RF Card Charging System and Method Overview and a RF Card Charging Operation Overview)

A user, an RF card charger, an RF card, a payment (=inputting money to a RF card charger) & RF [card] charge request, or an RF [card] charge, etc. operates organically, so the RF card can be charged with money.

A user delivers a payment & RF [card] charge request to an RF card charger, and the RF card charger transfers an RF [card] charge to a RF card in response to the payment &RF [card] charge request, so the RF card can be charged with money.

(An RF Card Payment System Overview and a RF Card Payment Operation Overview)

A user, an RF card payment machine, an RF card, an RF [card] payment request, or an RF [card] payment, etc. operate organically, so pay with money stored in the RF card.

A user delivers an RF [card] payment request to an RF card payment machine, and the RF card payment machine transmits an RF [card] payment to an RF card for a payment.

(Description of RF Card Elements)

An RF card is a medium that can store money in the form of electronic information or transmit the money in the form of electronic information to an external device.

A user is who owns a RF card.

An RF card charger is a device that can receive money and it store money in a RF card in the form of electronic information.

A payment & RF [card] charge request is what inputting money to a RF card charger and asking to charge the money into a RF card.

An RF [card] charge is what storing a RF card with money.

An RF card payment machine is a device that can pay with money of a RF card.

An RF [card] payment request is what asking a payment that uses money of a RF card.

An RF [card] payment is what paying with money of a RF card.

(A T-money (a Traffic Card) in Korea) A T-money in Korea is a kind of RF card. T-money's central account can be charged with money in the form of electronic information. The T-money does not distinguish users. The central account manages a T-money's serial number and money, does not verify a user, and deducts money of a T-money for payment. Since a user is not verified, if a T-money is lost, a balance cannot be compensated.

(RF card payment features) a) Money is stored in a RF card. b) A payment request process is performed by tagging a RF card with a RF card payment machine. c) There is no a user check process. d) A remittance process is performed by deducting money of a RF card. e) If a RF card is lost, a balance cannot be compensated. f) A RF card payment does not use confidential information. g) A RF card payment may be made only at a store that issued a RF card. h) A RF card payment cannot support various transactions. i) A RF card payment cannot support large payment. j) It is necessary to make a RF card for each store. k) Money should be paid in advance and charged to a RF card.

(Comparison of an RF card and a URL medium) a) A RF card stores money internally, but a URL medium stores it externally. b) A RF card has no secret information, but a URL medium has secret information (vault URL PWD). c) If a RF card is lost, a balance of the RF card is not preserved, but if a URL medium is lost, a balance of the URL medium is preserved. d) In a case of a RF card, it is difficult to apply other than face-to-face transactions, but a URL medium can be applied to various transactions. e) For transactions using an RF card, the RF card must be issued for each store, but for transactions using a URL medium, the transactions can be made in many stores using one URL medium.

(Problems of a RF card payment) a) As a RF card stores a small amount, the RF card payment cannot be a universal payment method. b) A RF card payment is only available at a store that can charge the RF card. c) It is difficult to apply universally to payment systems. d) A balance of a lost RF card is not preserved. e) A RF card payment cannot be a universal payment method because a RF card payment cannot be applied to various transactions. f) It is difficult to create added value.

Figure 2:
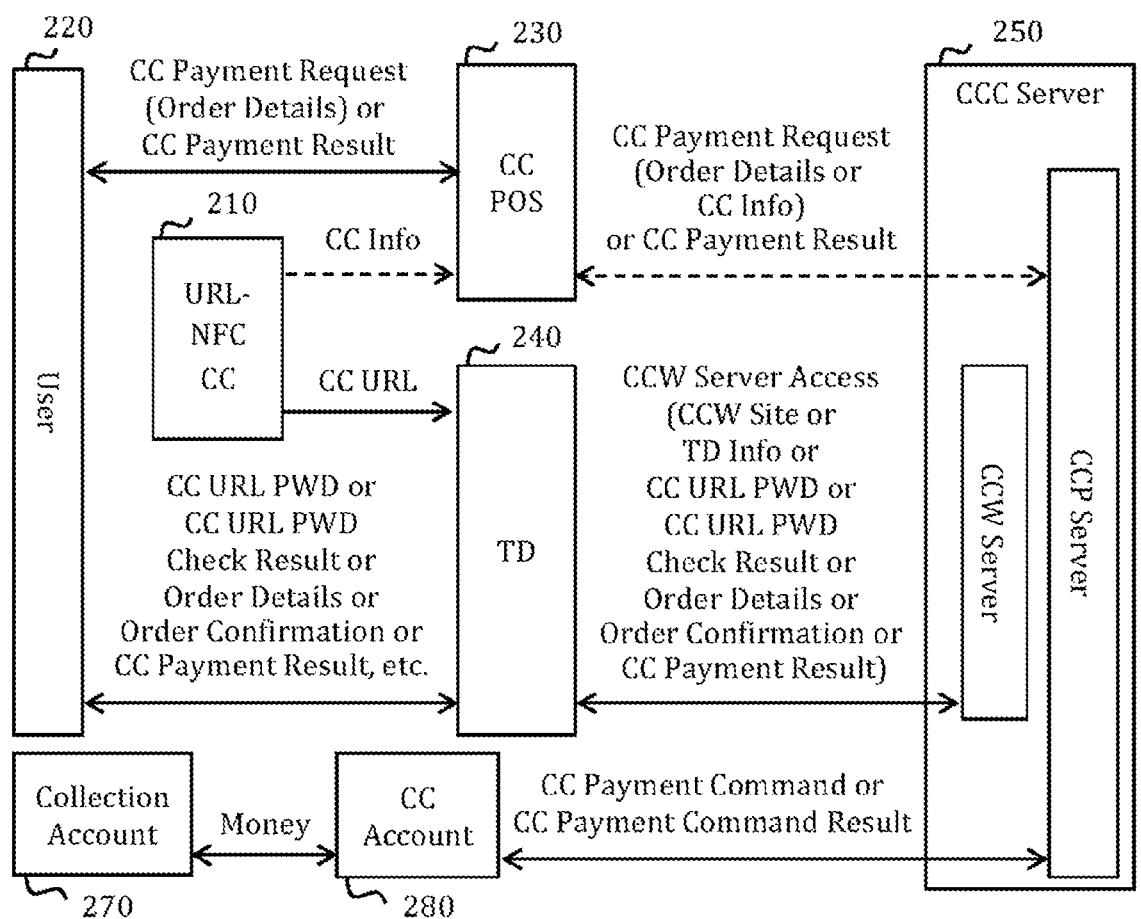
FIG. 2 is a block diagram of a system for paying with money being in an external device rather than a URL-NFC CC using the URL-NFC CC, a credit card network, and the Internet site. (The FIG. 2 configuration can be compared with the FIG. 7 embodiment.)
Figure 3:
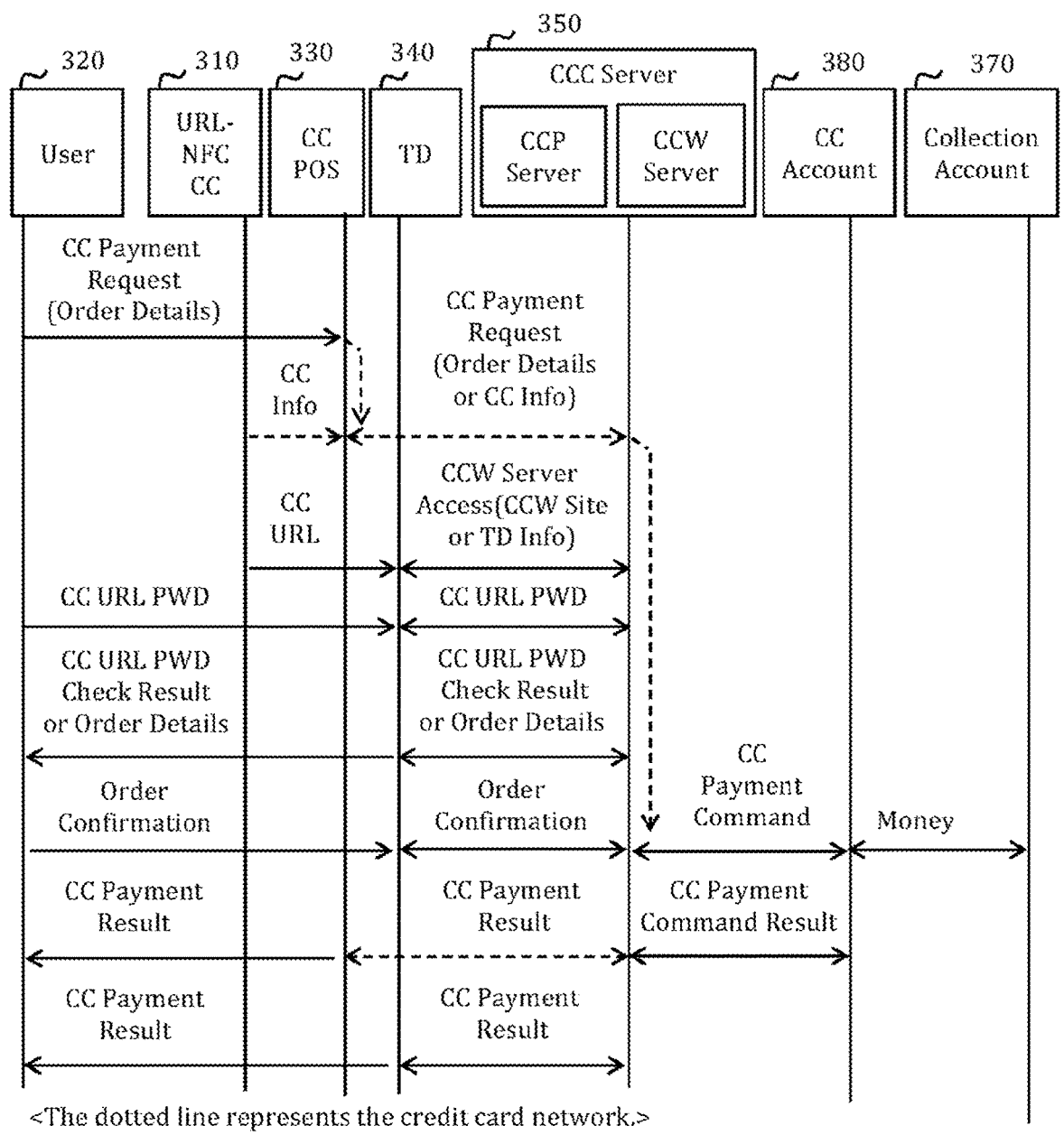
FIG. 3 is a flow diagram of method corresponding to the block diagram of FIG. 2. (The FIG. 3 configuration can be compared with the FIG. 8 embodiment.)
Figure 7:
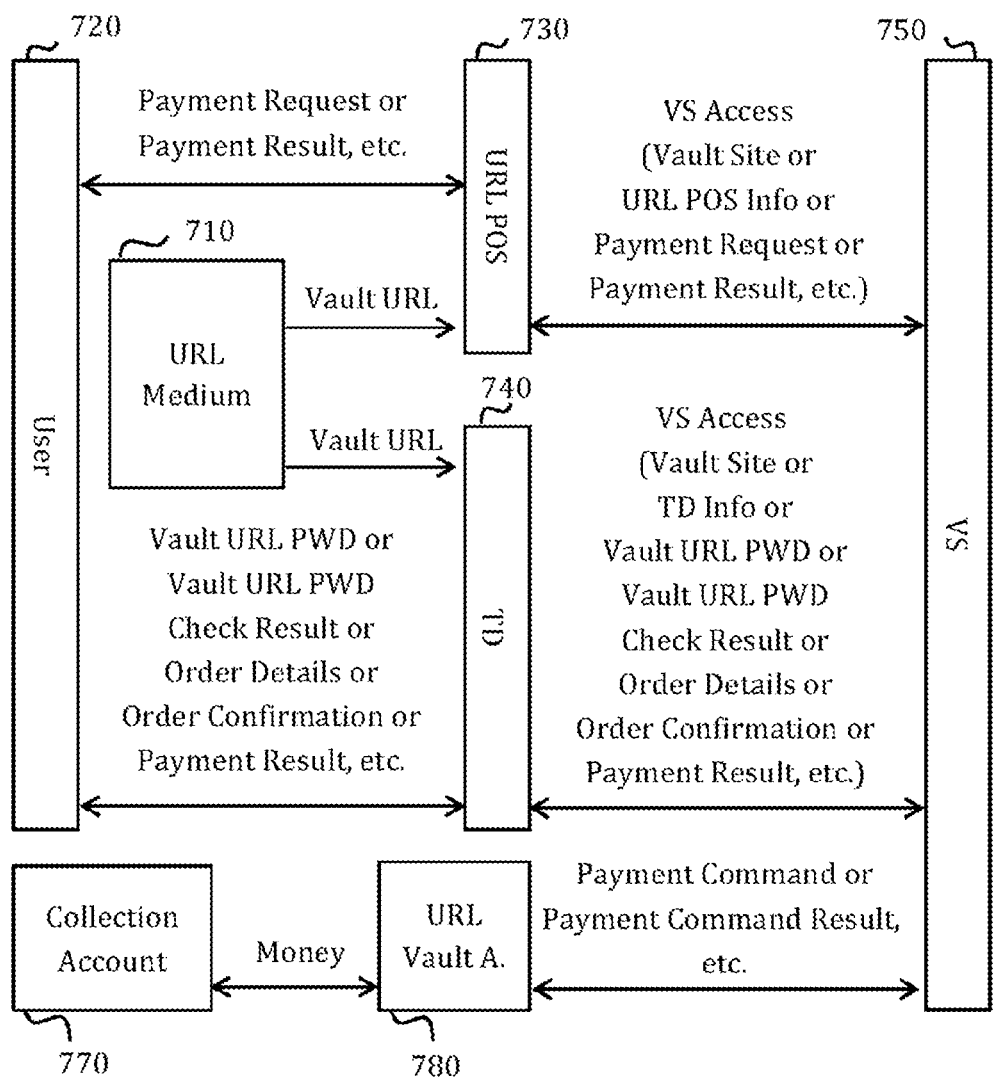
FIG. 7 is a block diagram of a system for paying with money stored in an external device rather than a URL medium using the URL medium and the Internet site in a face-to-face transaction confirming a user after requesting a payment.
Figure 8:
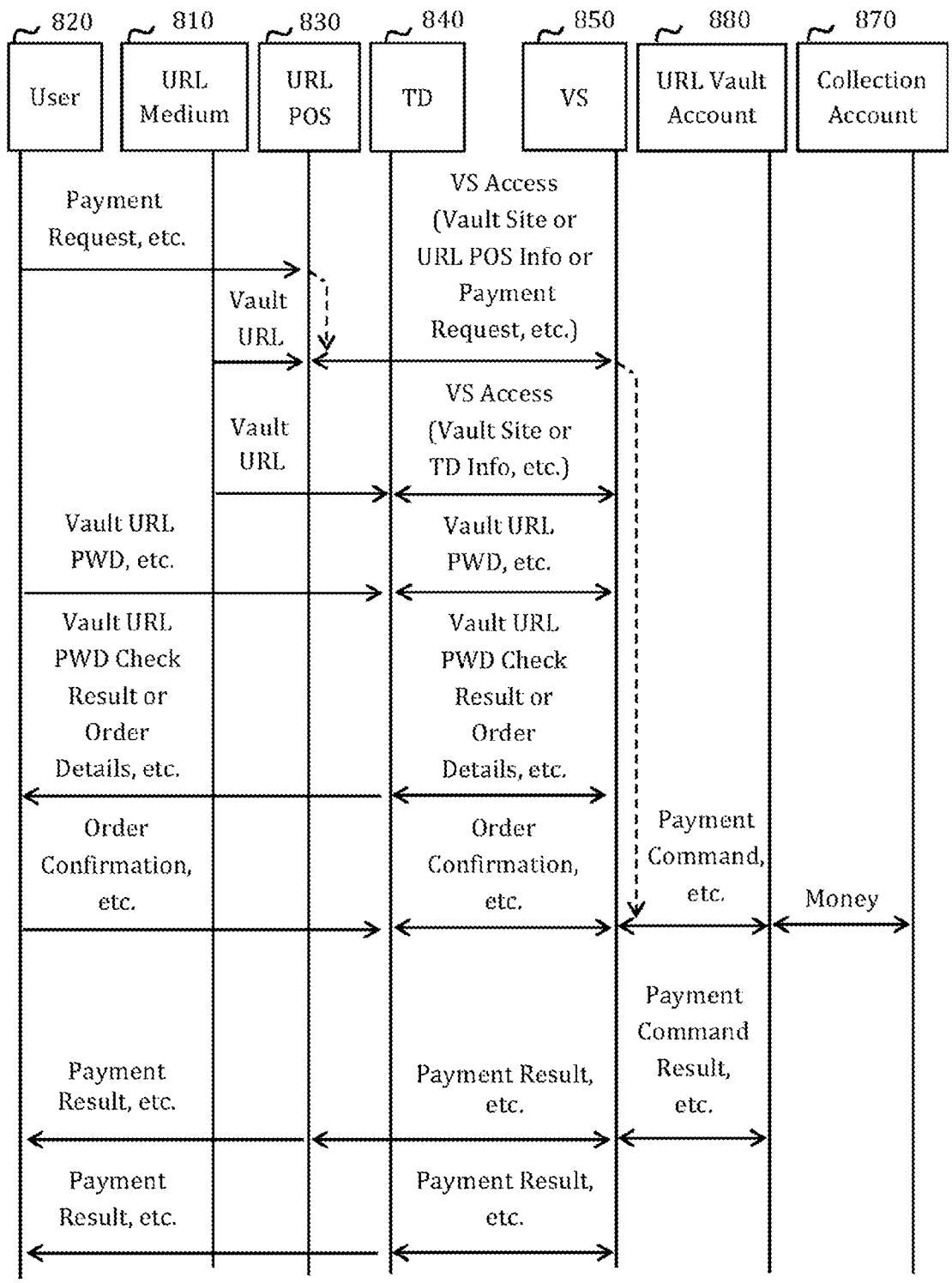
FIG. 8 is a flow diagram of method corresponding to the block diagram of FIG. 7.

<A Payment of a Conventional URL-NFC CC, Refer to FIGS. 2 and 3 in which can be Compared with FIGS. 7 and 8 of Embodiments of the Present Invention.>

(A Payment System and Method and Overview of a URL-NFC CC)

A user, a URL-NFC CC, a CC POS, a TD, a CCC server, a CC account, a collection account, a CC payment request, CC info, a CC URL, a CCW site, TD info, a CC URL PWD, a CC URL PWD check result, order details, an order confirmation, a CC payment command, money, a CC payment command result, and a CC payment result, etc. operate organically. A payment system and method of the URL-NFC CC pays with money being in an external device rather than the URL-NFC CC using 'a credit card network that communicates with the URL-NFC CC and the CC info' and 'the Internet site (CCW site) corresponding to the CC URL'.

(URL-NFC CC Payment Details)

A payment system and method including: a URL-NFC CC that can store CC info and a CC URL, deliver the CC info to a CC POS, and deliver a CC URL to a TD; the CC POS that can receive a CC payment request including order details from a user, receive the CC info from the URL-NFC CC, deliver the CC payment request to a CCP server of a CCC server, and deliver a CC payment result received from the CCP server to the user; the TD that can receive the CC URL from the URL-NFC CC, connect to a CCW server of the CCC server in response to the CC URL, communicate a CCW site or TD info with the CCW server, deliver a CC URL PWD received from the user to the CCW server, deliver a CC URL PWD check result or the order details received from the CCW server to the user, deliver an order confirmation received from the user to the CCW server, and deliver a CC payment result received from the CCW server to the user; a CCC server that can receive the CC payment request from the CCPOS, deliver a CC payment command to a CC account, receive a CC payment command result from the CC account, connect to 'the CCP server which can deliver the CC payment result to the CC POS, connect to the TD, communicate a CCW site or the TD info with the TD, receive the CC URL PWD from the TD, deliver the CC URL PWD check result or the order details to the TD, receive the order confirmation from the TD, and include the CCW server which can deliver the CC payment result to the TD; the CC account that can receive the CC payment command from the CCP server, deliver money to a collection account, and deliver the CC payment command result to the CCP server; and the collection account that can collect the money. and a payment method including: step a) in which a CC POS receives a CC payment request including order details from a user, receives CC info from a URL-NFC CC, and delivers the CC payment request to a CCP server of a CCC server; and the CCP server manages the CC payment request; step b) in which a TD receives a CC URL from the URL-NFC CC, connects to a CCW server of the CCC server in response to the CC URL, communicates a CCW site or TD info with the CCW server, and delivers a CC URL PWD received from the user to the CCW server; step c) in which the CCW server delivers a CC URL PWD check result or the order details to the TD; step d) in which the TD delivers the CC URL PWD check result or the order details to the user, and delivers an order confirmation received from the user to the CCW server; step e) in which the CCP server delivers a CC payment command to a CC account; step f) in which the CC account delivers money to a collection account; and the collection account collects the money; and the CC account delivers a CC payment command result to the CCP server; and step g) in which the CCP server delivers a CC payment result to the CC POS; and the CC POS delivers the CC payment result to the user; and the CCW server delivers the CC payment result to the TD; and the TD delivers the CC payment result to the user.

(Description of Elements of a URL-NFC CC Payment)

CC info is information that complies with credit card standards (ISO/IECJTC1/SC17, ISO 7816, ISO 14443, etc.).

CC info is a basis of a payment of a URL-NFC CC, it is stored in the URL-NFC CC, and it is a basis for creating a CC URL, a CC URL PWD, a CCW server of a CCC server, etc. The CC info is used in a payment request process and transmitted to the CCP server of the CCC server through a credit card network. The CC info cannot be used in a user check process, and cannot support access to the CCW server of the CCC server.

A CC URL is a URL that is dependent on CC info and can support access to a CCW server or a CCW site.

A CC URL is stored in a URL-NFC CC, used to check a user of CC info, and used as information to log in to a CCW server, and a CC URL PWD is set corresponding to the CC URL. The CC URL cannot use a credit card network, cannot support access to the CCP server, and cannot be used for 'transactions that do not verify a user', 'online payments', or 'payments or charging using two mediums.'

A URL-NFC CC is a medium that complies with credit card standards and stores CC info and a CC URL. The URL-NFC CC is also a medium in which a CC URL PWD is set.

A URL-NFC CC stores money externally, delivers CC info to a CCP server through a credit card network, and passes a CC URL to the CCW server through the Internet. The URL-NFC CC cannot be used for 'online payment' and 'payment and charging using two mediums.'

A URL-NFC CC is a type of a credit card, and since the URL-NFC CC must comply with the standard of credit card, a construction cost and a commission of a URL-NFC CC system and method are high.

A user is a subscriber of a credit card and who owns a URL-NFC CC.

A CC POS is a sales system and method of a store that supports the standard of credit card.

A CC POS can communicate CC info with other devices, connect to peripheral devices through a credit card network, and support general credit cards. The CC POS cannot communicate a CC URL with a URL-NFC CC, and does not support an online payment and 'a payment and a charging using two mediums'.

A CCC server consists of a CCP server that complies with the credit card standard, and a CCW server that is subordinate to the CCP server. The CCC server is a server that oversees a payment of a URL-NFC CC.

A CCC server supports a payment but does not support a charging. In the CCC server, a payment request process and a remittance process use a CCP server, but a user check process uses a CCW server, and the CCP server and the CCW server communicate with each other to make a payment. The CCC server supports a credit card payment, pays under CC info, a CC URL and a CC URL PWD matching, and does not support an online payment and 'a payment using two mediums'. A construction cost of the CCC server is high.

A CC account connects to the credit card network, holds money, and pays in response to CC info. The CC account does not support an online payment or 'a payment or a charging using two mediums'.

A TD, TD info, and a collection account of FIGS. 2 and 3 is different from the present invention's TD, TD info, a collection account, a communication method, peripheral devices, etc.

A CCW site is a Internet site corresponding to a CC URL that is dependent on CC info.

A CCW site uses a CC URL and a CC URL PWD to determine a login. The CCW site cannot deliver a CC payment request to other devices, does not support CC info, and cannot connect to a CCP server. A CCW server provides the CCW site and the CC URL PWD is set for logging into the CCW site.

A CC URL PWD is subordinate to CC info and a CC URL, and is secret information to log in to a CCW site.

A CC URL PWD is set in association with a URL-NFC CC, CC info, a CC URL, or a CCW site. The CC URL PWD is not stored in a medium, is memorized by the user, and is used for a CCW server to check a user.

A CC URL PWD check result is a result of checking a CC URL PWD.

A CC payment request, a CC payment command, a CC payment command result, and a CC payment result do use information related to a credit card, whereas a payment request, a payment command, a payment command result, and a payment result of the present invention do not use information related to a credit card.

A CC payment request of a URL-NFC CC payment can include CC info, but a payment request of the present invention cannot include CC info.

(Payment features of a URL-NFC CC) a) Everything related to a payment is dependent on a credit card system and is delivered to a CCP server through a credit card network. b) Money is stored an external device rather than a URL-NFC CC. c) A payment request process delivers CC info to a CCP server through a credit card network. d) In a user check process, a CCW server verifies a user using a CC URL and a CC URL PWD. e) A remittance process transfers money from an external device rather than a URL-NFC CC to another account. The external device rather than the URL-NFC CC means a CC account. f) A used order of a payment request process and a user check process can be changed. g) A production cost of a medium is high because the medium stores CC info and a CC URL separately and delivers the CC info and the CC URL to outsides in different ways. h) Since CC info requesting a payment and a CC URL verifying a user has different paths and attributes each, a construction cost and an operation cost of a system and method are high. i) A payment system and method of a URL-NFC CC cannot store money using the URL-NFC CC. j) A payment system and method of a URL-NFC CC cannot support non-face-to-face transactions. (KR 10-1751640 and KR 10-1941587 are patents for face-to-face transactions.) k) A payment system and method of a URL-NFC CC cannot pay using two URL-NFC CCs. l) Since a URL-NFC CC payment uses a payment path and a system and method of a credit card, so a fee is charged based on the credit card. m) Internet site exposure is limited because Internet sites are not used when requesting payment. n) As exposures of Internet sites are limited, creations of added value using Internet sites are also limited.

(CC info) CC info complies with the standard of credit card and is a basis of a URL-NFC CC, a CC URL, a CC URL PWD, a CCW site, and a CCC server (a CCP server+a CCW server), etc. In the present invention, there is no CC info or a concept comparable thereto.

(Comparison of a CC URL and a vault URL) a) A CC URL is generated dependent on CC info, but a vault URL is generated independently. b) A CC URL is dependent on CC info to support a payment, but a vault URL supports a payment without depending on anything. c) A CC URL cannot be used to request a payment, but a vault URL can be used to request the payment. d) In order to request a payment, a CC URL connects to a CCW server, but in order to request a payment and in order to confirm a user, a vault URL connects to a VS. e) A CC URL cannot be used for 'transactions without a user verification', 'an online transactions', or 'transactions or a charging using two mediums', but a vault URL can support transactions and a charging.

(Comparison of a CCW site and a vault site) a) A CCW site is dependent on CC info, but a vault site is not dependent on credit card information. b) For logging in a CCW site, a CC URL PWD that dependents on CC info is set, but for logging in a vault site, a vault URL PWD that is not related with credit card information is set. c) A CCW site uses a CC URL and a CC URL PWD, which are dependent on CC info, to determine a login, but a vault site uses a vault URL and a vault URL PWD, which are not related credit card information, to determine a login. d) A CCW site does not support 'transactions that do not verify a user', 'online transactions', or 'transactions or a charging using two mediums', but a vault site can support transactions or a charging.

(Comparison of a CC URL PWD and a vault URL PWD) a) A CC URL PWD is set in response to a CC URL related to CC info, but a vault URL PWD is set in response to a vault URL without relating to credit card information. b) A CC URL PWD is used as secret information to log in to a CCW site subordinated to CC info, but a vault URL PWD can be used as secret information to log in to a vault site without subordinating credit card information. c) In a system and method using a CC URL PWD, a payment is made under a CC URL PWD, CC info, and a CC URL matching, but in a system and method using a vault URL PWD, a payment is made under a vault URL PWD and a vault URL matching. d) A system and method using a CC URL PWD does not support 'transactions that do not verify a user', 'online transactions', or 'transactions or a charging using two mediums', but a system and method using a vault URL PWD can support transactions or a charging.

(Comparison of a URL-NFC CC and a URL medium) a) A URL-NFC CC complies with credit card standards, but a URL medium does not comply with credit card standards. b) A URL-NFC CC stores CC info that complies with credit card standards, but a URL medium does not store information that complies with credit card standards. c) Two pieces of information on a URL-NFC CC to request a payment and confirm a user are different, but two pieces of information on a URL medium are the same. d) A URL-NFC CC does not support 'online transactions' or 'transactions or a charging using two mediums', but a URL medium can support transactions or a charging.

(Comparison of a CC POS and a URL POS) a) A CC POS complies with credit card standards, but a URL POS does not comply with credit card standards. b) A CC POS does not support 'online transactions' or 'transactions or a charging using two mediums', but a URL POS can support a payment or a charging.

(Comparison of a CCC sever and a VS) a) A CCC server complies with credit card standards, but a VS does not comply with credit card standards. b) A CCC server is composed of a CCP server and a CCW server, but a VS is composed of one Web Server. c) In a CCC server, a payment request process and a remittance process are executed by a CCP server and a user check process is executed by a CCW server, but in a VS three processes are executed by one server. d) A CCC server does not support 'online transactions' or 'transactions or a charging using two mediums', but a VS can support transactions or a charging.

(Comparison of 'a CCW server of a CCC server' and 'a VS') Both a CCW server and a VS are web servers based on the Internet, but there are differences as follows.

a) A CCW server is dependent on a CCP server, but a VS is independent. b) A CCW server performs only a user check process, which is one part of a payment process, but a VS performs the entire payment processes. c) A CCW server communicates with a CCP server for an offline payment, but a VS does not need to communicate with other servers for an offline payment.

(Comparison of a CC account and a URL vault account) a) A CC account is connected to a credit card network, but a URL vault account is not connected to a credit card network. b) A CC account cannot be charged using a medium (URL-NFC CC), but a URL vault account can be charged using a medium (URL medium).

(Problems of a payment of a URL-NFC CC) a) A payment of a URL-NFC CC must use a credit card system and method. b) A production cost of a medium (URL-NFC CC) is high. c) A cost of maintaining a system and method is high because attributes of a path for requesting a payment and a path for verifying a user are different. d) There is a fee for using a credit card system and method. e) A payment of a URL-NFC CC cannot support a payment of online transactions. f) A payment using two mediums (URL-NFC CC) cannot be supported. g) It cannot be charged using a medium. h) When paying with a user's money also, additional fees for using a credit card system and method are incurred. i) Creations of added value are limited.

Figure 4:
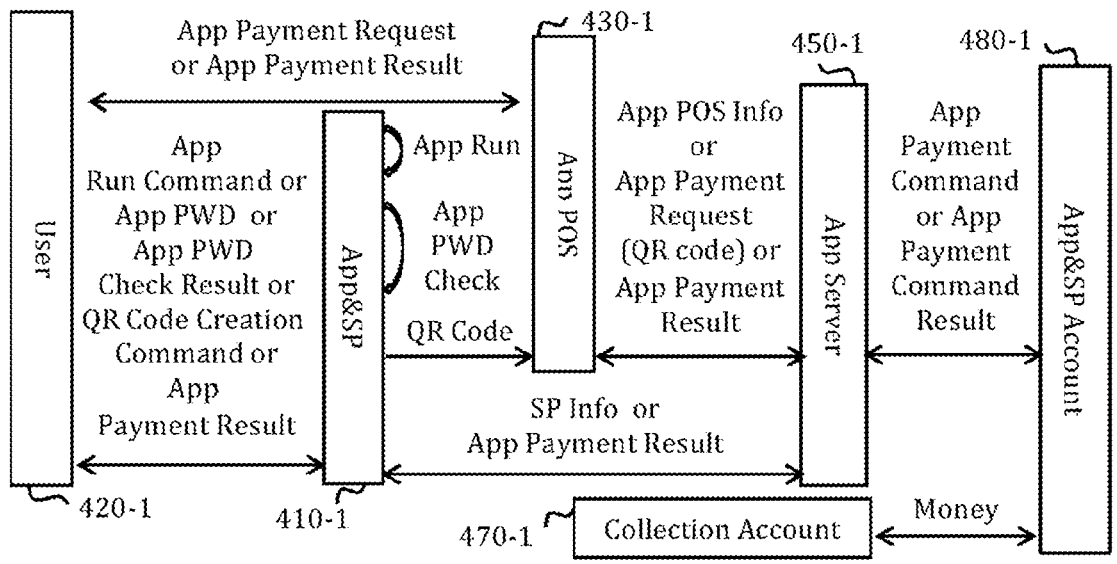
FIG. 4 is a block diagram and flow diagram of a system and method for paying with money being in an external device rather than an App&SP using the App&SP and an App& mobile communication network.
Figure 4:
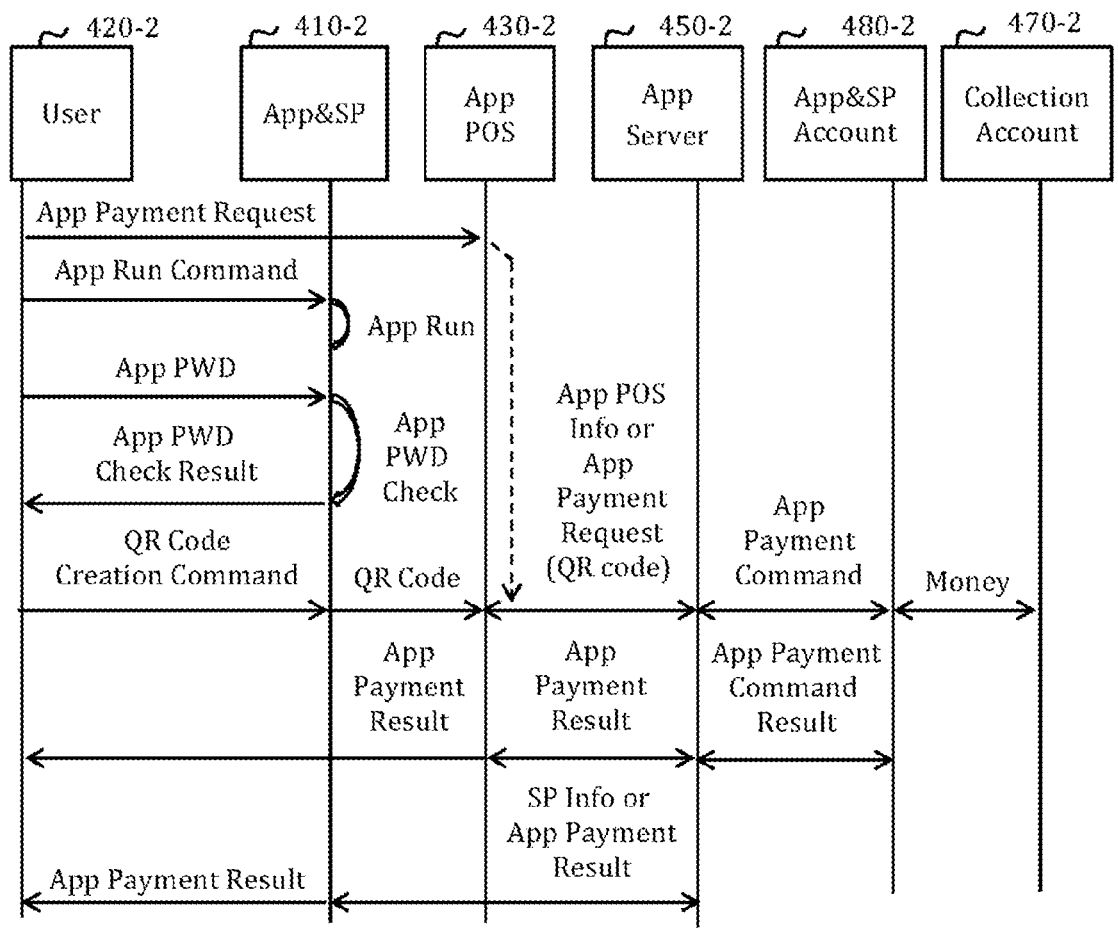

<Conventional an App&SP Payment (WeChat Pay or Alipay), Refer to FIG. 4>

(Overview of an App&SP's a Payment System and Method)

A user, an app POS, an app&SP, an app server, an app&SP account, a collection account, an app, an app payment request, an app run command, an app PWD, an app PWD check result, a QR code creation command, a QR code, app POS info, an app payment command, money, an app payment command result, and an app payment result, etc. operate organically. The App&SP's a payment system and method pays with the money being in an external device rather than a medium (app&SP) using the medium (app&SP) and an app& mobile network.

(App&SP Payment Details)

A payment system and method, including: an app&SP that can contain an app and a USIM, set an app PWD, receive an app run command from a user, run the app, receive the app PWD from the user, check the app PWD, deliver an app PWD check result to the user, receive a QR code creation command from the user, generate a QR code, deliver the QR code to an app POS, receive an app payment result from an app server, and deliver the app payment result to the user; the app POS that can receive an app payment request from the user, receive the QR code from the app&SP, connect to the app server, deliver the app payment request including app POS info or the QR code to the app server, and deliver the app payment result received from the app server to the user; the app server that can connect to the app POS, receive the app POS info or the app payment request from the app POS, deliver an app payment command to an app&SP account corresponding to the QR code, receive an app payment command result from the app&SP account, and deliver the app payment result to the app POS or the app&SP; the app&SP account that can receive the app payment command from the app server, deliver money to a collection account, and deliver the app payment command result to the app server; and a collection account which can collect the money. and a payment method, including: step a) in which an app POS receives an app payment request from a user; step b) in which an app&SP receives an app run command from the user, runs an app, receives an app PWD from the user, checks the app PWD, delivers an app PWD check result to the user, receives a QR code creation command from the user, generates a QR code, and delivers the QR code to the app POS; step c) in which the app POS connects to an app server, and delivers the app payment request including app POS info or the QR code to the app server; step d) in which the app server delivers an app payment command to an app&SP account corresponding to the QR code; step e) in which the app&SP account delivers money to a collection account; and the collection account collects the money; and the app&SP account delivers an app payment command result to the app server; and step f) in which the app server delivers an app payment result to the app POS or the app&SP; and the app POS or the app&SP delivers the app payment result to the user.

(Description of the Elements of App&SP)

An app is an application software that supports a payment or a charging.

An app can be provided by an app server and installed on a smart phone equipped with a USIM. A app PWD corresponding to the app may be set. The app can check the app PWD and store electronic information that can generate a QR code. The app also can generate the QR code.

A QR code is a user ID and is used as log information of an app server.

A QR code is generated on an app&SP after confirming an app PWD. A QR code is generated whenever paying or charging. A QR code is generated on a medium (app&SP) and delivered to an app POS and an app server. A QR code is used at a different stage from an app PWD, and can designate an app&SP account.

A smart phone is a mobile communication terminal, and includes a USIM and an app. A smart phone identifies a user with a USIM and connects to a mobile communication network. A smart phone without a USIM cannot run an App for a payment or a charging.

A USIM is provided to a subscriber of a mobile communication network, is used to identify a user (=subscriber), and supports connecting to a mobile communication network. Without a USIM, a payment or a charging is impossible.

The present invention does not require a USIM, and there is no concept comparable to a USIM.

SP info is information on a smart phone including an App and USIM information. However, TD info of the present invention does not include an App or USIM information.

An app&SP is a medium including a terminal function of a smart phone which contains a USIM and an app for a payment or a charging.

An app&SP stores an app PWD and electronic information making a QR code, identifies a user with only the app PWD, creates the QR code whenever paying, delivers the QR code to an app POS, and performs a payment request process and a user check process.

Electronic information of a QR code is stored in a memory device of a smart phone and is invisible.

A user is who owns and uses a medium (App&SP).

An app POS is an offline sales system and method to support paying a payment using an App&SP and includes an app for paying and charging.

An app POS receives an app payment request from a user, receives a QR code from an app&SP, connects to an app& mobile network, and transmits an app payment request including the QR code to an app server.

App POS info is information of an app POS.

An app server is a server that supports a payment and a charging using an App&SP.

An app server provides an app, interlocks with a medium (app&SP) where the app is installed, recognizes a QR code as a user ID, does not store a app PWD, and does not perform a user check process. An app server performs a remittance process in response to a QR code and communicates with an app&SP, an app POS and an app& mobile network.

An app&SP account is an account that connects to a app& mobile network, holds money, and supports a payment and a charging in response to a QR code.

An app run command is an order to run an app, and the present invention has no concept comparable to it.

An App PWD is secret information that allows a user to log in to a medium (app&SP).

An app PWD is used as a password to generate a QR code, which is a ID of a user of a medium (app&SP), is stored in a medium, is not delivered to an app server, and is used for different purposes and processes from a QR code.

An app PWD check result is a result that a medium (App&SP) has checked an app PWD.

A QR code creation command is an order to make a QR code, and the present invention does not have a similar concept.

An app payment request, an app payment command, an app payment command result, and an app payment result all use an app for a payment or a charging, so a payment request, a payment command, a payment command result, and a payment result of the present invention are different from them.

An app payment request of an app&SP payment can include a QR code, but a payment request of the present invention cannot include a QR code.

(Comparison of an App and an Internet Site)
1) An app is installed and starts on a device such as a smart phone or an app POS, but an Internet site starts on a web server.
2) An App starts on a device (such as a smart phones or an App POS). However, an internet site stars on a web server.
3) An app runs on a device and connects to an App server when needed. However, an Internet site links with a web server to do all operations.
4) Since an app is installed on a device, it is difficult to reflect service changes in real time, but since an Internet site is installed on a web server, it is easy to reflect service changes in real time.
5) An App is likely to be hacked. However, Internet sites are unlikely to be hacked than an app.
6) Information of an app of an app&SP (=a medium) is easily leaked, due to loss or replacement of the App&SP. Information of a URL medium (=a medium) corresponding to an Internet site is not leaked due to loss or replacement of the URL medium.
7) An app runs only on a device where the app is installed, but an Internet site can run on all device connected to the Internet.
8) An app&SP (medium) uses an app& mobile network, but a URL medium uses the Internet.

(An app&SP payment's features) a) Money is stored an external device rather than an app&SP. b) In a payment request process, a QR code is transmitted to an app POS and an app server through an app &mobile communication network. c) In a user check process, an app&SP checks an app PWD. d) In a remittance process, money in an external device rather than an app&SP is transferred to another account. e) A payment request process is necessarily performed after a user check process is performed. (an order cannot be changed) f) A QR code, which is a user ID, is generated whenever paying or charging. g) An app PWD is used to create a QR code, and the QR code is used to deliver money. (the app PWD, which is secret information, and the QR code, which is a user ID, are not used for the same purpose at the same time) h) A smart phone with an app and a USIM is required. i) A user's own smart phone is required for a payment. j) An app and a smart phone must store and manage an app PWD. k) A user must run an app to form a QR code. l) There is a high possibility that an app will be hacked. m) When a smart phone is lost, it is easy to leak 'electronic information of a QR code' or an app PWD. n) Changed services or contents cannot be reflected in real time. o) It is difficult to create added values using internet sites.

(Comparison of "an app PWD and a QR code in FIG. 4" and "a vault URL PWD and a vault URL in the present invention") A QR code is generated, which is a user ID, using an app PWD, and then the QR code is only used to log in to an app server in the FIG. 4. However, the present invention does not generate a user ID and uses a vault URL PWD and a vault URL to log in to a VS.

(Comparison of a QR code and a vault URL) a) A QR code is a image information including a user ID and information a App server, but a vault URL is electronic information including a user ID and information of a VS. b) A QR code alone supports logging in to an app server, but a vault URL is used with a vault URL PWD to log in to a vault site. c) Whenever paying or charging, a QR code needs to be generated, but a vault URL does not need to be generated. d) A QR code is used after verifying an app PWD, but a vault URL can be used without a password (vault URLPWD). e) A QR code cannot access an Internet sites, but a vault URL can access an Internet sites. f) A QR code requires a USIM-equipped smart phone, but a vault URL does not require.

(Comparison of an app PWD and a vault URL PWD) a) An app PWD is the secret information for logging in to the medium (app&SP) alone, but the vault URL PWD is the secret information for logging in to the Internet site (vault site) with the vault URL, etc. b) An app PWD is used as information to create a QR code, which is a user ID, but a vault URL PWD is not used as information to create a user ID. c) An app PWD is stored in a medium (app&SP), but a vault URL PWD is not stored in a medium (URL medium). d) An app PWD is checked by a medium (app&SP), but a vault URL PWD is checked by a server.

(Comparison of an app&SP and an URL medium) a) An app&SP consists of an app and a smart phone with a USIM. However, a URL medium does not require an app, a USIM, and a smart phone. b) An app&SP stores an app PWD inside, but a URL medium does not store a vault URL PWD inside. c) An app&SP checks an app PWD, but a URL medium does not check a vault URL PWD. d) An app&SP creates a QR code that is a user ID, but a URL medium does not create a user ID. e) An app&SP needs a function to communicate with a user, but a URL medium does not need.

(Comparison of an app&SP's a smart phone and a TD) a) A smart phone requires a USIM, but a TD does not need. b) A smart phone needs to install an app, but a TD does not need. c) A smart phone contains the function as a medium, but a TD does not contain. d) A smart phone stores an app PWD and identifies a user with an app PWD, but a TD does not store and not verify.

(Comparison of an app POS and an URL POS) a) An App POS requires an app, but an URL POS does not need an app. b) An App POS receives a QR code, but a URL POS does not receive a QR code. c) An App POS delivers information corresponding to a QR code to an app server, but a URL POS does not deliver.

(Comparison of an app server and a VS) a) An App server oversees Apps, but a VS oversees Internet sites. b) An app server does not store an app PWD, but a VS stores a vault URL PWD. c) An app server does not check an app PWD, but a VS checks a vault URL PWD. d) An app server performs only a remittance process, but a VS performs a payment request process, a user check process, and a remittance process. e) An app server verifies a user with only a QR code, but a VS verifies a user with a vault URL, a vault URL PWD, and/or TD information.

(Payment problems using a medium (app&SP)) a) A cost of configuring a medium (app&SP) is high. b) An app with a risk of hacking is used. c) One person must own and use the same smart phone. d) Whenever paying or charging, a QR code must be generated. e) A medium (App&SP) should store an app PWD. f) A process of executing an app is necessary. g) An order of a user check process and a payment request process cannot be changed, so a payment using an App&SP cannot support various transactions. h) A payment using an App&SP cannot create added values using Internet sites. i) When a smart phone is lost and replaced, there is a high possibility that an app PWD, etc. is leaked. j) There is a cost of using a mobile communication network.

A payment method and a charging method are described with reference to the drawings (from the drawing 5 to the drawing 28).

Figure 5:
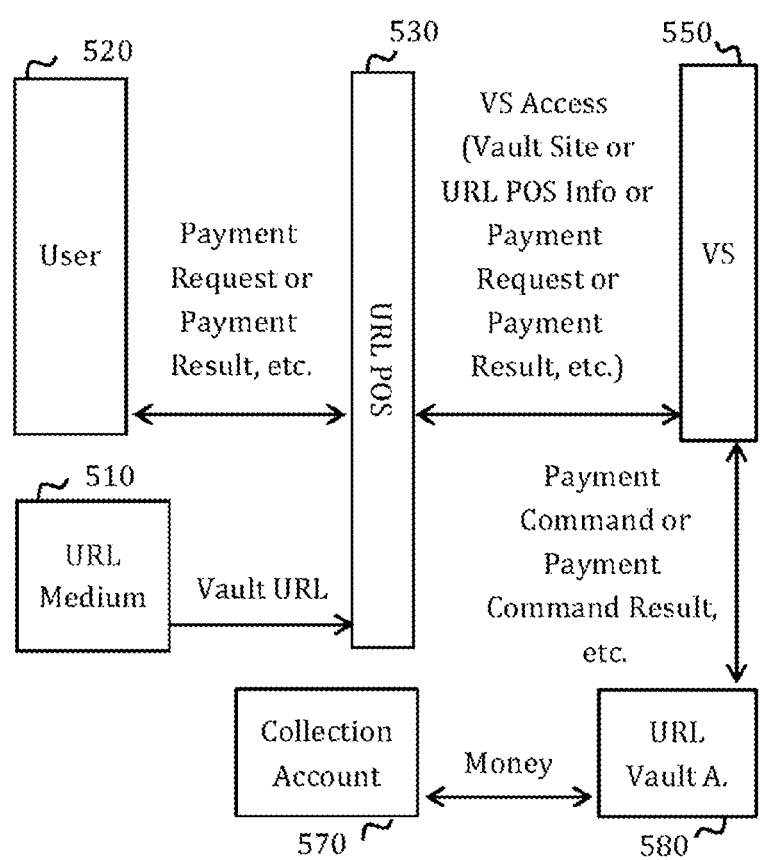
FIG. 5 is a block diagram of a system for paying with money stored in an external device rather than a URL medium using the URL medium and the Internet site in a face-to-face transaction without a user confirmation.
Figure 6:
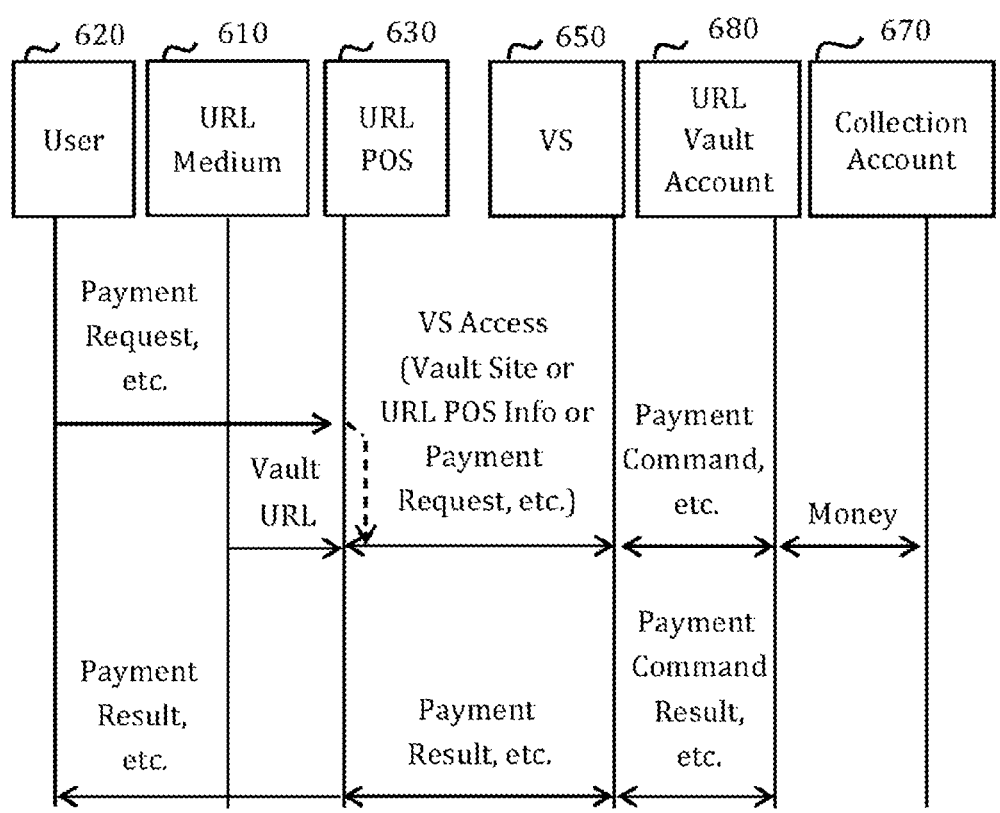
FIG. 6 is a flow diagram of method corresponding to the block diagram of FIG. 5.

<A Payment of Face-to-Face Transactions without a User Confirmation, Refer to FIGS. 5 and 6>

A URL medium can store a vault URL, etc. or deliver a vault URL to a URL POS.

A URL POS can receive a payment request, etc. from a user, receive a vault URL from a URL medium, connect to a VS in response to the vault URL, deliver URL POS info, or the payment request, etc. to the VS, or deliver a payment result, etc. received from the VS to the user.

A VS can connect to a URL POS in response to a vault URL, receive URL POS info, or a payment request, etc. from the URL POS, deliver a payment command, etc. to a URL vault account, receive a payment command result, etc. from the URL vault account, or deliver a payment result, etc. to the URL POS.

A URL vault account can receive a payment command, etc. from a VS, deliver money to a collection account, or deliver a payment command result, etc. to the VS.

A collection account can collect money. A payment system (FIG. 5) can include a URL medium, a URL POS, a VS, a URL vault account, and a collection account, etc.

Step a) in which a URL POS receives a payment request, etc. from a user, receives a vault URL from a URL medium, connects to a VS in response to the vault URL, or delivers URL POS info, or a payment request, etc. to the VS.

Step b) in which the VS connects to the URL POS in response to the vault URL or delivers a payment command, etc. to a URL vault account.

Step c) in which the URL vault account delivers money to a collection account.

Step d) in which the collection account collects the money; the URL vault account delivers a payment command result, etc. to the VS; the VS deliver a payment result, etc. to the URL POS; or the URLPOS delivers the payment result, etc. to the user. A payment method (FIG. 6) can include the above steps and other steps.

A payment system (FIG. 5) or a payment method (FIG. 6) pays with money of a URL vault account (an external device rather than a URL medium), using the medium (URL medium) and the Internet.

FIGS. 5 and 6 are useful for a small payment.

<A Payment of a Face-to-Face Transaction Confirming a User after Receiving a Payment Request, Refer to FIGS. 7 and 8>

A URL medium can store a vault URL, etc. or deliver a vault URL to a URL POS or a TD.

A URL POS can receive a payment request, etc. from a user, receive a vault URL from a URL medium, connect to a VS in response to the vault URL, deliver URL POS info, or a payment request, etc. to the VS, or deliver a payment result, etc. received from the VS to the user.

A TD can receive a vault URL from a URL medium, connect to a VS or a vault site in response to the vault URL, deliver TD info, etc. to the VS, deliver a vault URL PWD, etc. received from a user to the VS, deliver a vault URL PWD check result, or order details, etc. received from the VS to the user, deliver an order confirmation, etc. received from the user to the VS, or deliver a payment result, etc. received from the VS to the user.

A VS can connect to a URL POS in response to a vault URL, receive a URL POS info, or a payment request, etc. from the URL POS, connect to a TD in response to the vault URL, communicate a vault site, or TD info, etc. with the TD, receive a vault URL PWD, etc. from the TD, deliver a vault URL PWD check result, or order details, etc. to the TD, receive an order confirmation, etc. from the TD, deliver a payment command, etc. to a URL vault account, receive a payment command result, etc. from the URL vault account, or deliver a payment result, etc. to the URL POS or the TD.

A URL vault account can receive a payment command, etc. from a VS, deliver money to a collection account, or deliver a payment command result, etc. to the VS.

A collection account can collect money. A payment system (FIG. 7) can include a URL medium, a URL POS, a TD, a VS, a URL vault account, and a collection account, etc.

Step a) in which a URL POS receives a payment request, etc. from a user, receives a vault URL from a URL medium, connects to a VS in response to the vault URL, or delivers URL POS info, or the payment request, etc. to the VS; or the VS manages the URL POS info, or the payment request, etc.

Step b) in which the TD receives the vault URL from the URL medium, connects to the VS or a vault site in response to the vault URL, delivers TD info, etc. to the VS, or delivers a vault URL PWD, etc. received from the user to the VS.

Step c) in which the VS delivers a vault URL PWD check result, or order details, etc. to the TD; the TD delivers the vault URL PWD check result, or the order details, etc. to the user, or delivers an order confirmation, etc. received from the user to the VS; or the VS delivers a payment command, etc. to a URL vault account.

Step d) in which the URL vault account delivers money to a collection account.

Step e) in which the collection account collects the money; the URL vault account delivers a payment command result, etc. to the VS; the VS delivers a payment result, etc. to the URL POS or the TD; or the URL POS or the TD delivers the payment result, etc. to the user. A payment method (FIG. 8) can include the above steps and other steps.

A payment system (FIG. 7) or a payment method (FIG. 8) pays with money of a URL vault account (an external device rather than a URL medium), using a medium (a URL medium) and an internet site (vault site).

Figure 9:
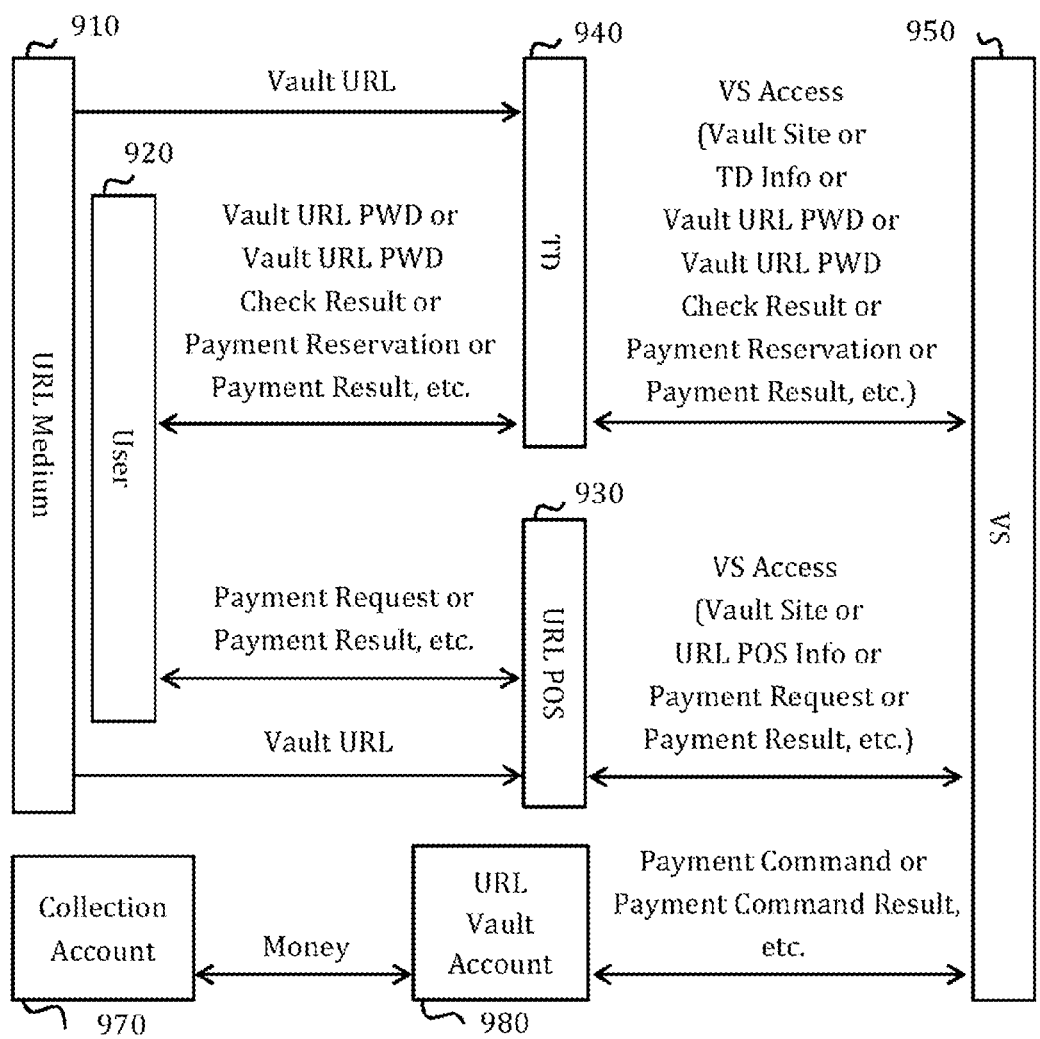
FIG. 9 is a block diagram of a system for paying with money stored in an external device rather than a URL medium using the URL medium and the Internet site in a face-to-face transaction requesting a payment after confirming a user.
Figure 10:
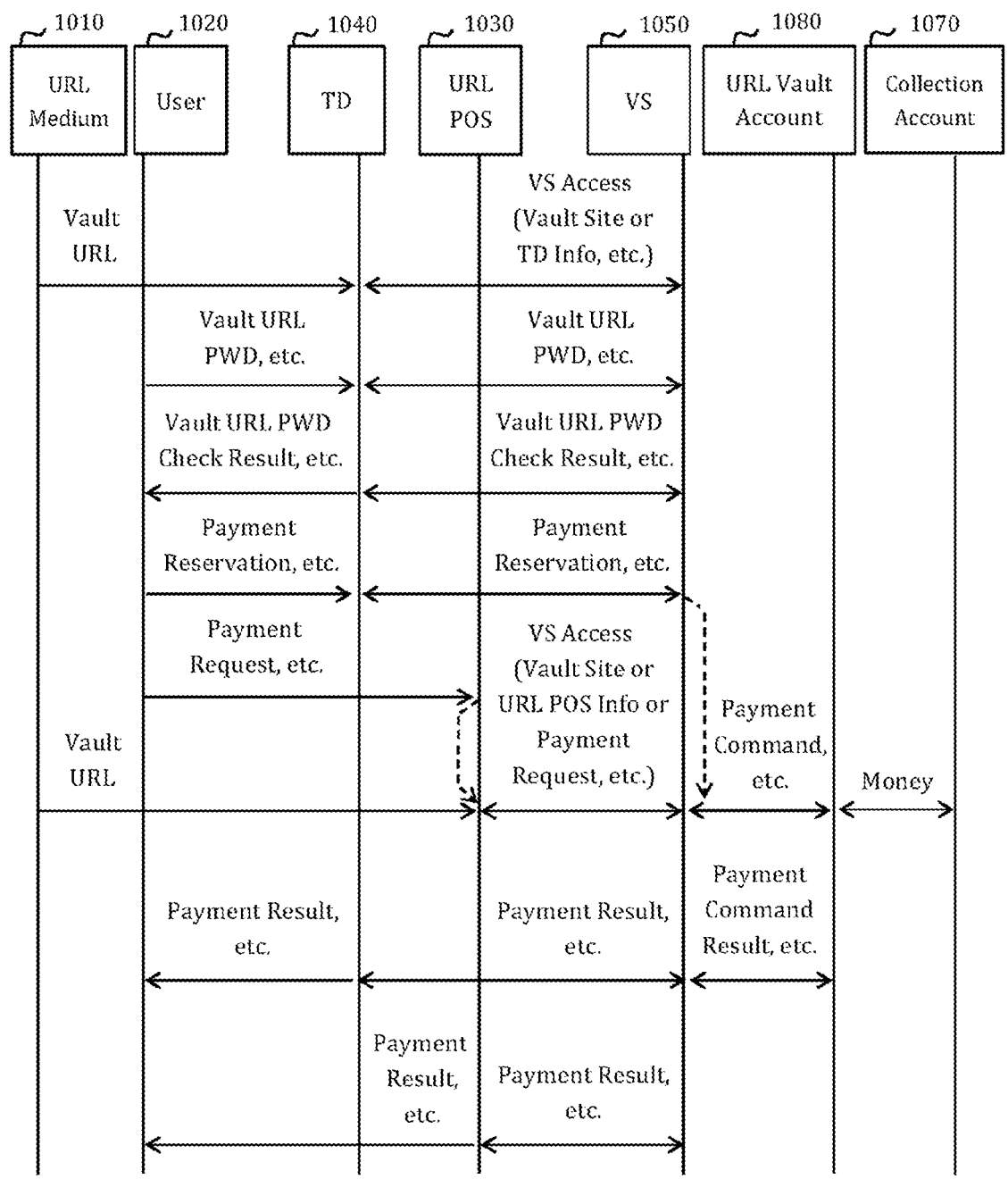
FIG. 10 is a flow diagram of method corresponding to the block diagram of FIG. 9.

<A Payment in a Face-to-Face Transaction Receiving a Payment Request after Confirming a User, Refer to FIGS. 9 and 10>

A URL medium can store a vault URL, etc. or deliver the vault URL to a TD or a URL POS.

A TD can receive a vault URL from a URL medium, connect to a VS or a vault site in response to the vault URL, deliver TD info, etc. to the VS, deliver a vault URL PWD, etc. received from a user to the VS, deliver a vault URL PWD check result, etc. received from the VS to the user, deliver a payment reservation (=payment schedule), etc. received from the user to the VS, or deliver a payment result, etc. received from the VS to the user.

A URL POS can receive a payment request, etc. from a user, receive a vault URL from a URL medium, connect to a VS in response to the vault URL, deliver URL POS info, or the payment request, etc. to the VS, or deliver a payment result, etc. received from the VS to the user.

A VS can connect to a TD in response to a vault URL, communicate a vault site, or TD info, etc. with the TD, receive a vault URL PWD, etc. from the TD, deliver a vault URL PWD check result, etc. to the TD, receive a payment reservation, etc. from the TD, connect to a URL POS in response to the vault URL, receive URL POS info, or a payment request, etc. from the URL POS, deliver a payment command, etc. to a URL vault account, receive a payment command result, etc. from the URL vault account, or deliver a payment result, etc. to the TD or the URL POS.

A URL vault account can receive a payment command, etc. from a VS, deliver money to a collection account, or deliver a payment command result, etc. to the VS.

A collection account can collect money. A payment system (FIG. 9) can include a URL medium, a TD, a URL POS, a VS, a URL vault account, and a collection account, etc.

Step a) in which a TD receives a vault URL from a URL medium, connects to a VS or a vault site in response to the vault URL, delivers TD info, etc. to the VS, or delivers a vault URL PWD, etc. received from a user to the VS; the VS delivers a vault URL PWD check result, etc. to the TD; the TD delivers a vault URL PWD check result, etc. to the user, or delivers a payment reservation, etc. received from the user to the VS; or the VS manages the payment reservation, etc.

Step b) in which a URL POS receives a payment request, etc. from the user, receives the vault URL from the URL medium, connects to the VS in response to the vault URL, or delivers URL POS info, or the payment request, etc. to the VS.

Step c) in which the VS delivers a payment command, etc. to a URL vault account.

Step d) in which the URL vault account delivers money to a collection account.

Step e) in which the collection account collects money; the URL vault account delivers a payment command result, etc. to the VS. The VS delivers a payment result, etc. to the TD or the URL POS; or the URL POS or the TD delivers the payment result, etc. to the user. A payment method (FIG. 10) can include the above steps and other steps.

A payment system (FIG. 9) or a payment method (FIG. 10) pays with money of a URL vault account (an external device rather than a URL medium), using a medium (URL medium) and an internet site (vault site).

FIGS. 7, 8, 9, and 10 are useful for transactions with a large payment.

Figure 11:
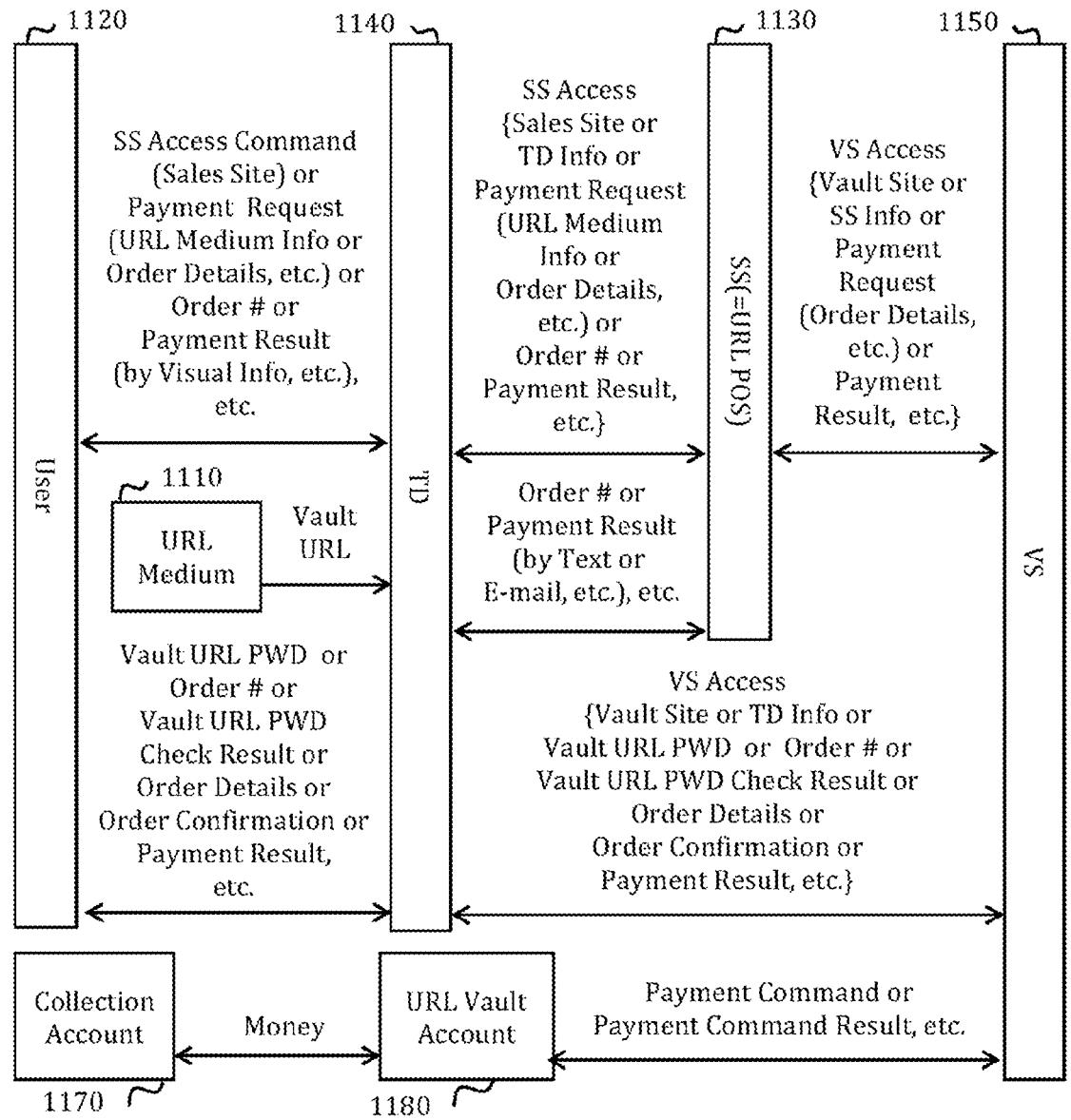
FIG. 11 is a block diagram of a system for paying with money stored in an external device rather than a URL medium using the URL medium and the Internet site in a non-face-to-face transaction that confirms a user after requesting a payment.
Figure 12:
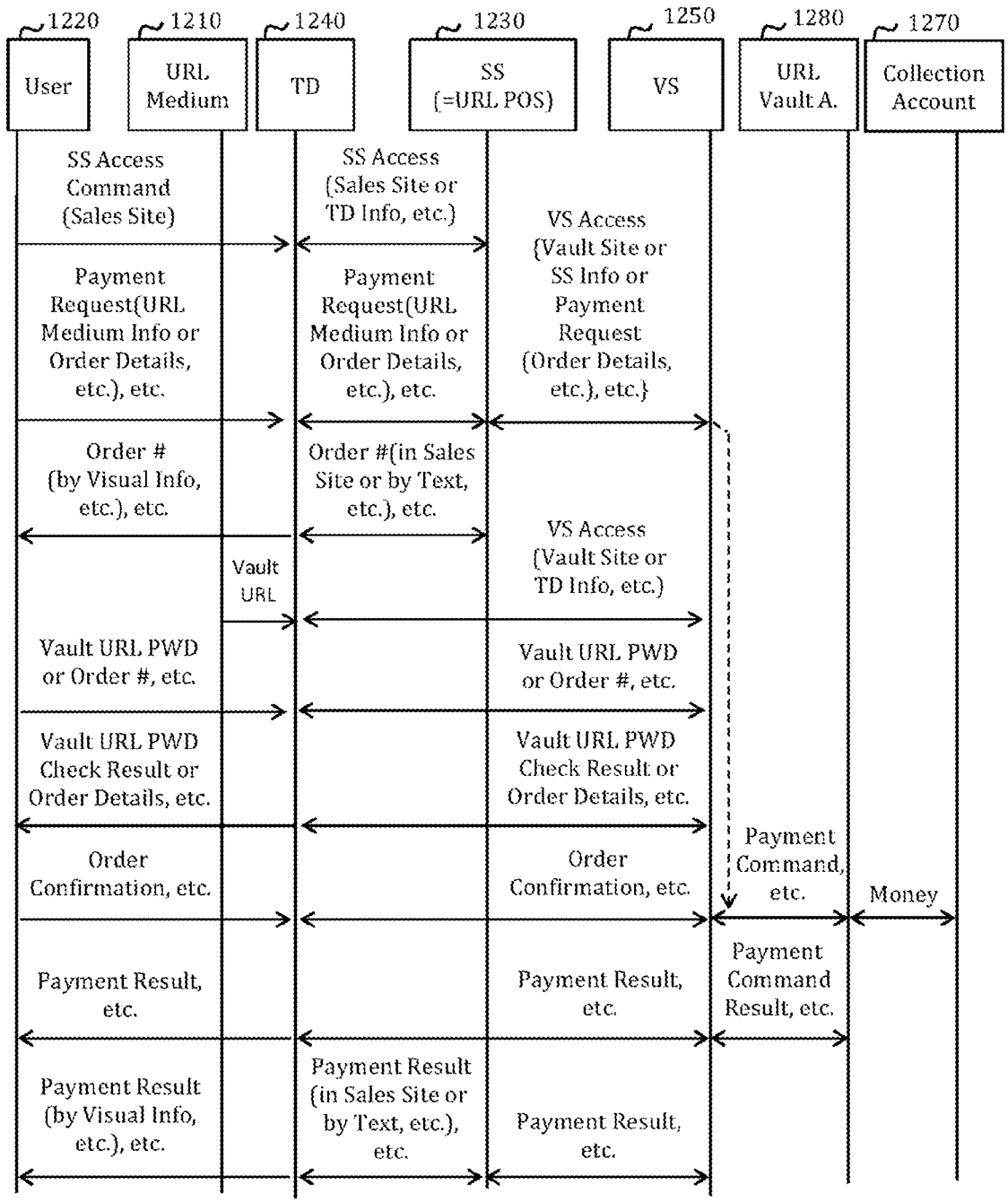
FIG. 12 is a flow diagram of method corresponding to the block diagram of FIG. 11.

<A Payment of a Non-Face-to-Face Transaction Confirming a User after Receiving a Payment Request, Refer to FIGS. 11 and 12>

A URL medium can store a vault URL, etc. or deliver a vault URL to a TD.

A TD can connect to a SS or a sales site in response to a user's a SS access command, deliver a payment request including URL medium info, or order details, etc. received from the user to the SS, receive a vault URL from a URL medium, connect to a VS or a vault site in response to the vault URL, deliver TD info, etc. to the VS, deliver a vault URL PWD, etc. received from the user to the VS, deliver a vault URL PWD check result, or order details, etc. received from the VS to the user, deliver an order confirmation, etc. received from the user to the VS, or deliver a payment result, etc. received from the VS or the SS to the user.

A SS can connect to a TD, communicate a sales site, or TD info, etc. with the TD, receive a payment request, etc. from the TD, connect to the VS or a vault site in response to a URL medium info, deliver SS info, or the payment request, etc. to the VS, or deliver a payment result, etc. received from the VS to the TD.

A VS can connect to a SS, receive SS info, or a payment request, etc. from the SS, connect to a TD in response to a vault URL, communicate a vault site, or TD info, etc. with the TD, receive a vault URL PWD, etc. from the TD, deliver a vault URL PWD check result, or order details, etc. to the TD, receive an order confirmation, etc. from the TD, deliver a payment command, etc. to a URL vault account, receive a payment command result, etc. from the URL vault account, or deliver a payment result, etc. to the SS or the TD.

A URL vault account can receive a payment command, etc. from a VS, deliver money to a collection account, or deliver a payment command result, etc. to the VS.

A collection account can collect money. A payment system (FIG. 11) can include a URL medium, a TD, a SS, a VS, a URL vault account, and a collection account, etc.

Step a) in which a TD connects to a SS or a sales site in response to a user's a SS access command, or delivers a payment request including URL medium info, or order details, etc. received from the user to the SS.

Step b) in which the SS connects to the TD, connects to a VS or a vault site in response to the URL medium info, or delivers SS info, or the payment request, etc. to the VS; or the VS manages the payment request, etc.

Step c) in which the TD receives a vault URL from a URL medium, connects to the VS or a vault site in response to the vault URL, delivers TD info, etc. to the VS, or delivers a vault URL PWD, etc. received from the user to the VS.

Step d) in which the VS delivers a vault URL PWD check result, or the order details, etc. to the TD; the TD delivers the vault URL PWD check result, or the order details, etc. to the user, or delivers an order confirmation, etc. received from the user to the VS; or the VS delivers a payment command, etc. to a URL vault account.

Step e) in which the URL vault account delivers money to a collection account.

Step g) in which the collection account collects the money; the URL vault account delivers a payment command result, etc. to the VS; the VS delivers a payment result, etc. to the SS or the TD; the SS delivers the payment result, etc. to the TD; or the TD delivers the payment result, etc. to the user. A payment method (FIG. 12) can include the above steps and other steps.

A payment system (FIG. 11) or a payment method (FIG. 12) pays with money of a URL vault account (an external device rather than a URL medium), using a medium (URL medium) and an internet site (vault site).

A payment request can include URL medium info, and a URL POS can connect to a VS or a vault site using URL medium info.

Figure 13:
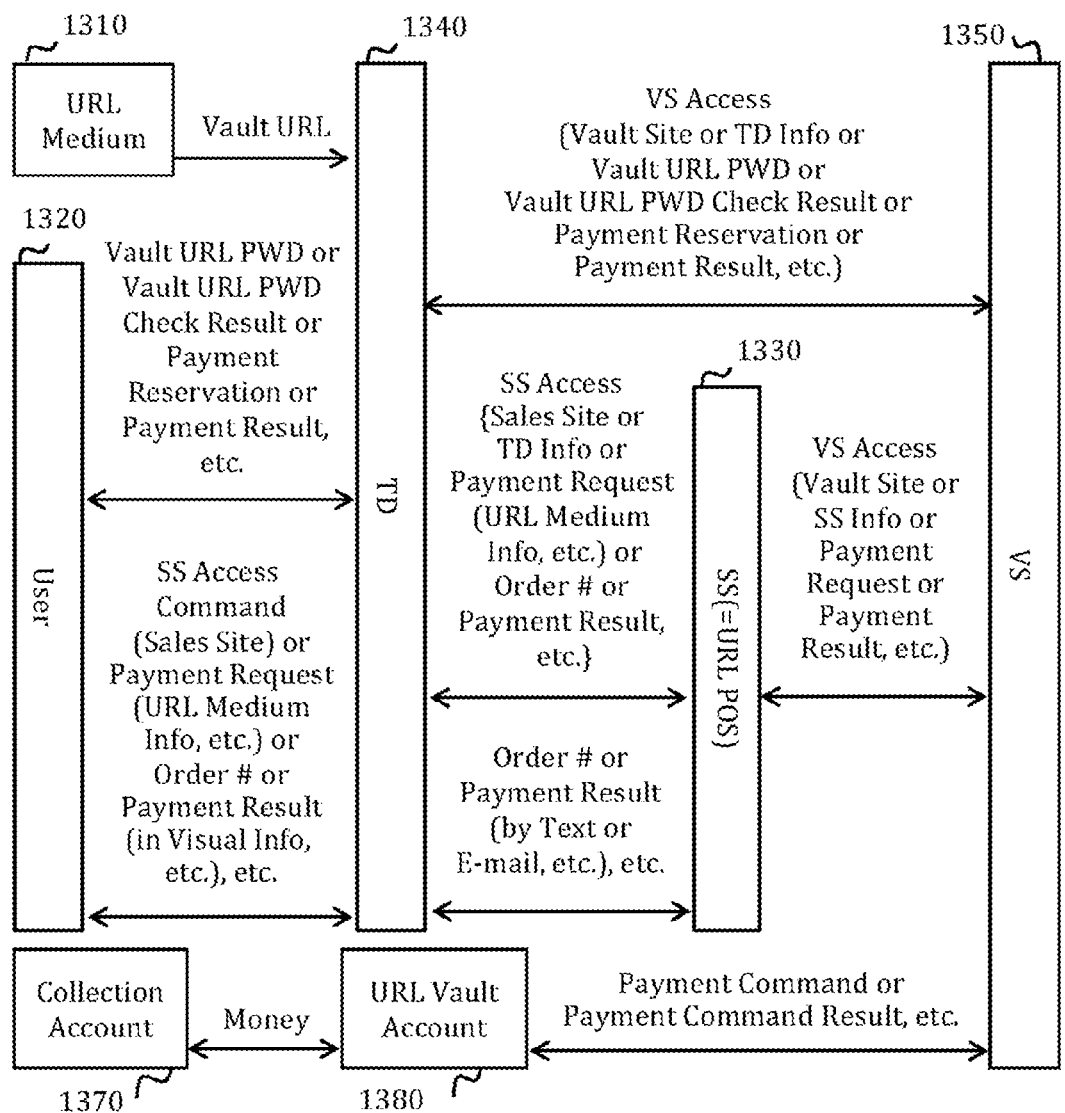
FIG. 13 is a block diagram of a system for paying with money stored in an external device rather than a URL medium using the URL medium and the Internet site in a non-face-to-face transaction requesting a payment after confirming a user.
Figure 14:
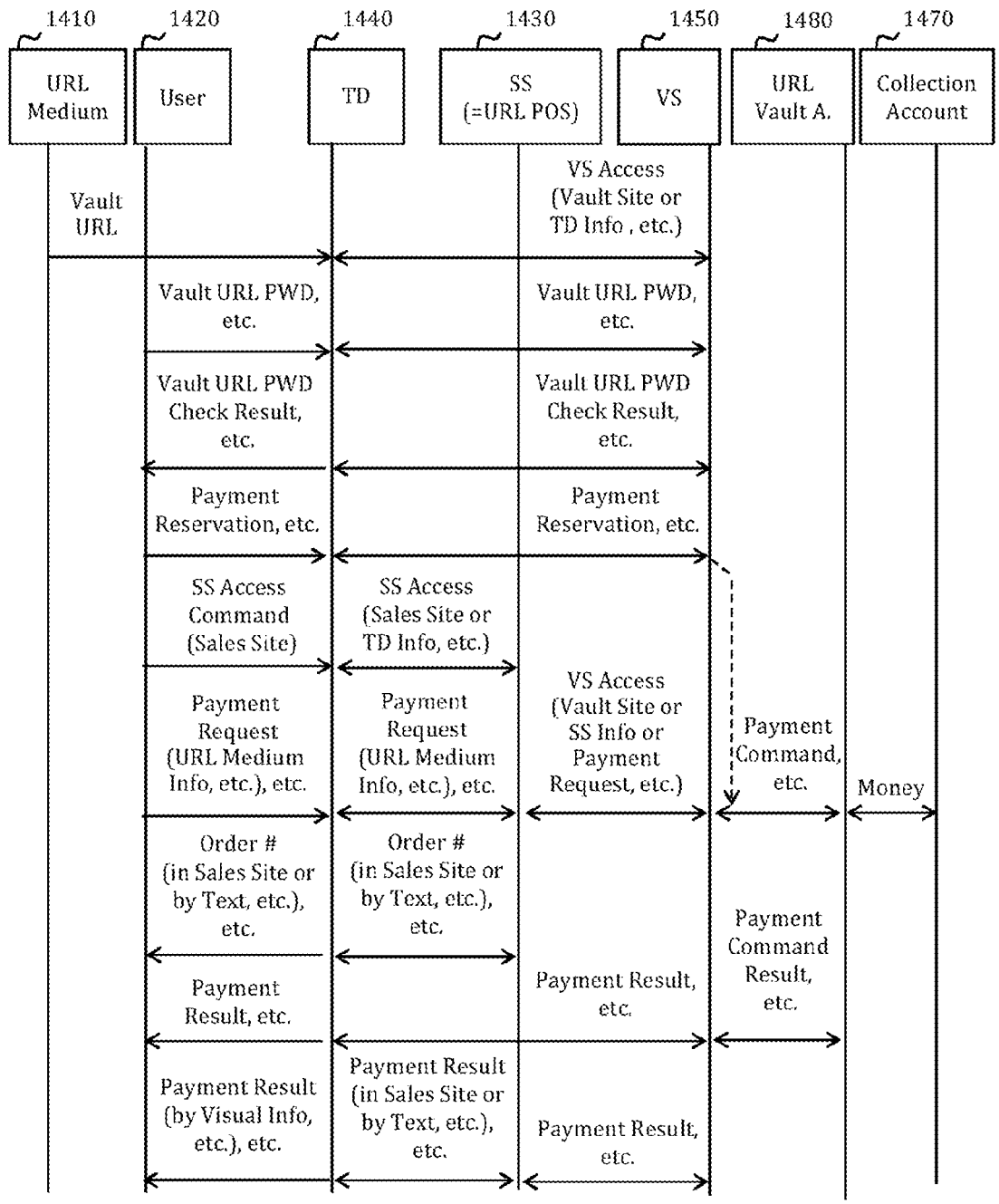
FIG. 14 is a flow diagram of method corresponding to the block diagram of FIG. 13.

<A Payment of a Non-Face-to-Face Transaction Receiving a Payment Request after Confirming a User, Refer to FIGS. 13 and 14>

A URL medium can store a vault URL, etc. or deliver a vault URL to a TD.

The TD can receive the vault URL from the URL medium, connect to a VS or a vault site in response to the vault URL, deliver TD info, etc. to the VS, deliver a vault URL PWD, etc. received from a user to the VS, deliver a vault URL PWD check result, etc. received from the VS to the user, deliver a payment reservation (=a payment schedule), etc. received from the user to the VS, connect to a SS or a sales site in response to a user's a SS access command, deliver a payment request including URL medium info, etc. received from the user, etc. to the SS, deliver an order #, etc. received from the SS to the user, or deliver a payment result, etc. received from the SS or the VS to the user.

A SS can connect to a TD, communicate a sales site with the TD, receive a payment request, etc. from the TD, deliver an order #, etc. to the TD, connect to the VS in response to URL medium info, deliver SS info or a payment request, etc. to the VS, or deliver a payment result, etc. received from the VS to the TD.

A VS can connect to a TD in response to a vault URL, communicate a vault site or TD info, etc. with the TD, receive a vault URL PWD, etc. from the TD, deliver a vault URL PWD check result, etc. to the TD, receive a payment reservation, etc. from the TD, connect to a SS, receive SS info or a payment request, etc. from the SS, deliver a payment command, etc. to a URL vault account, receive a payment command result, etc. from the URL vault account, or deliver a payment result, etc. to the TD or the SS, etc.

A URL vault account can receive a payment command, etc. from a VS, deliver money to a collection account, or deliver a payment command result, etc. to the VS.

A collection account can collect money. A payment system (FIG. 13) can include a URL medium, a TD, a SS, a VS, a URL vault account, and a collection account, etc.

Step a) in which a TD receives a vault URL from a URL medium, connects to a VS or a vault site in response to the vault URL, delivers TD info, etc. to the VS, or delivers a vault URL PWD, etc. received from a user to the VS; the VS delivers a vault URL PWD check result, etc. to the TD; the TD delivers a vault URL PWD check result, etc. to the user, or delivers a payment reservation (=a payment schedule), etc. received from the user to the VS; the VS manages the payment reservation, etc.; or the TD connects to a SS or a sales site in response to the user's a SS access command, or delivers a payment request including URL medium info received from the user, etc. to the SS.

Step b) in which the SS can deliver an order #, etc. to the TD, connect to the VS in response to the URL medium info, or deliver SS info or the payment request, etc. to the VS; or the TD can deliver the order #, etc. to the user.

Step c) in which the VS delivers a payment command, etc. to a URL vault account.

Step d) in which the URL vault account delivers money to a collection account.

Step e) in which the collection account collects the money; the URL vault account delivers a payment command result, etc. to the VS; the VS delivers a payment result, etc. to the TD or the SS; the SS delivers the payment result, etc. to the TD; or the TD delivers the payment result, etc. to the user. A payment method (FIG. 14) can include the above steps and other steps.

A payment system (FIG. 13) or a payment method (FIG. 14) pays with money of a URL vault account (an external device rather than a URL medium), using a medium (URL medium) and an internet site (vault site).

A payment request can include URL medium info, and a SS can connect to a VS or a vault site using the URL medium info.

Figure 15:
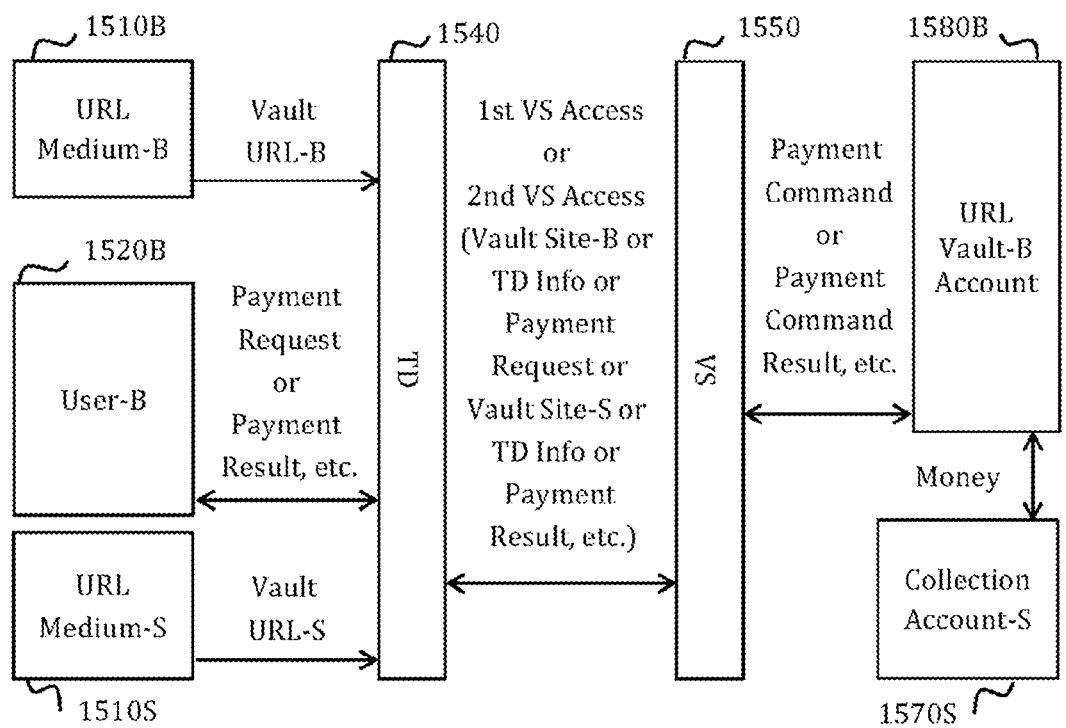
FIG. 15 is a block diagram of a system for paying with money stored in an external device rather than a URL medium using two URL mediums and the Internet site in a face-to-face transaction without a user confirmation.
Figure 16:
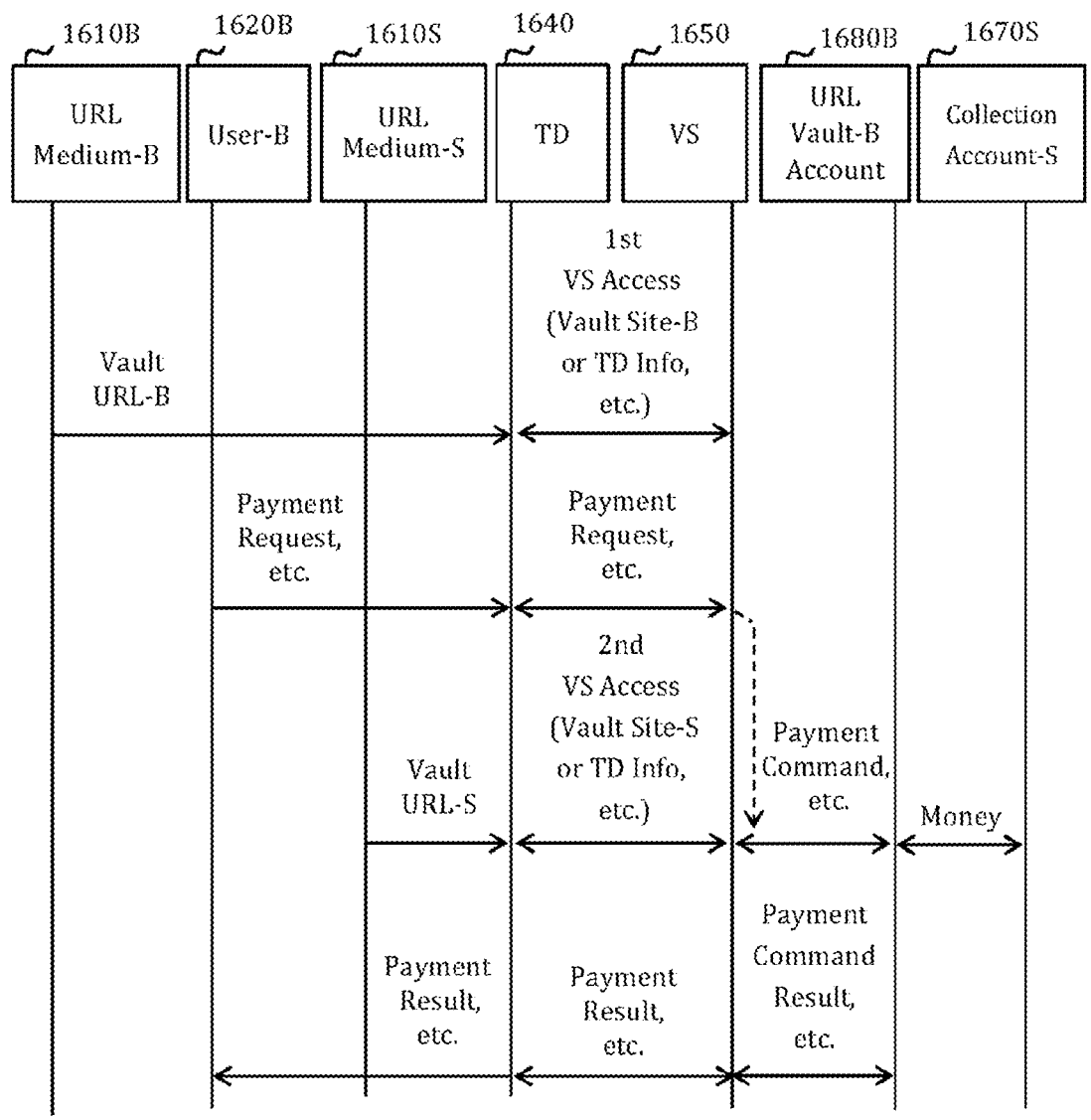
FIG. 16 is a flow diagram of method corresponding to the block diagram of FIG. 15.

<A Payment of Face-to-Face Transactions Using Two URL Mediums without Confirming a User, Refer to FIGS. 15 and 16>

A URL medium-B can store a vault URL-B, etc. or deliver the vault URL-B to a TD.

A URL medium-S can store a vault URL-S, etc. or deliver the vault URL-S to a TD.

A TD can receive a vault URL-B from a URL medium-B, connect to a VS or a vault site-B in response to the vault URL-B, deliver TD info, etc. to the VS, deliver a payment request, etc. received from a user-B to the VS, receive a vault URL-S from a URL medium-S, connect to the VS in response to the vault URL-S, or deliver a payment result, etc. received from the VS to the user-B.

A VS can connect to a TD in response to a vault URL-B, communicate a vault site-B or TD info, etc. with the TD, receive a payment request, etc. from the TD, connect to the TD in response to a vault URL-S, deliver a payment command, etc. to a URL vault-B account, receive a payment command result, etc. from the URL vault-B account, or deliver a payment result, etc. to the TD.

A URL vault-B account can receive a payment command, etc. from a VS, deliver money to a collection account-S, or deliver a payment command result, etc. to the VS.

A collection account-S can collect money. A payment system (FIG. 15) can include a URL medium-B, a URL medium-S, a TD, a VS, a URL vault-B account, and a collection account-S, etc.

Step a) in which a TD receives a vault URL-B from a URL medium-B, connects to a VS or a vault site-B in response to the vault URL-B, delivers TD info, etc. to the VS, or delivers a payment request, etc. received from a user-B to the VS; or the VS manages the payment request, etc.; or the TD receives a vault URL-S from a URL medium-S, or connects to the VS in response to the vault URL-S.

Step b) in which the VS delivers a payment command, etc. to a URL vault-B account.

Step c) in which the URL vault-B account delivers money to a collection account-S.

Step d) in which the collection account-S collects the money; the URL vault-B account delivers a payment command result, etc. to the VS; the VS delivers a payment result, etc. to the TD; or the TD delivers the payment result, etc. to the user-B. A payment method (FIG. 16) can include the above steps and other steps.

A payment system (FIG. 15) or a payment method (FIG. 16) pays with money of a URL vault account (an external device rather than a URL medium), using a medium (URL medium) and an internet site (vault site).

Figure 17:
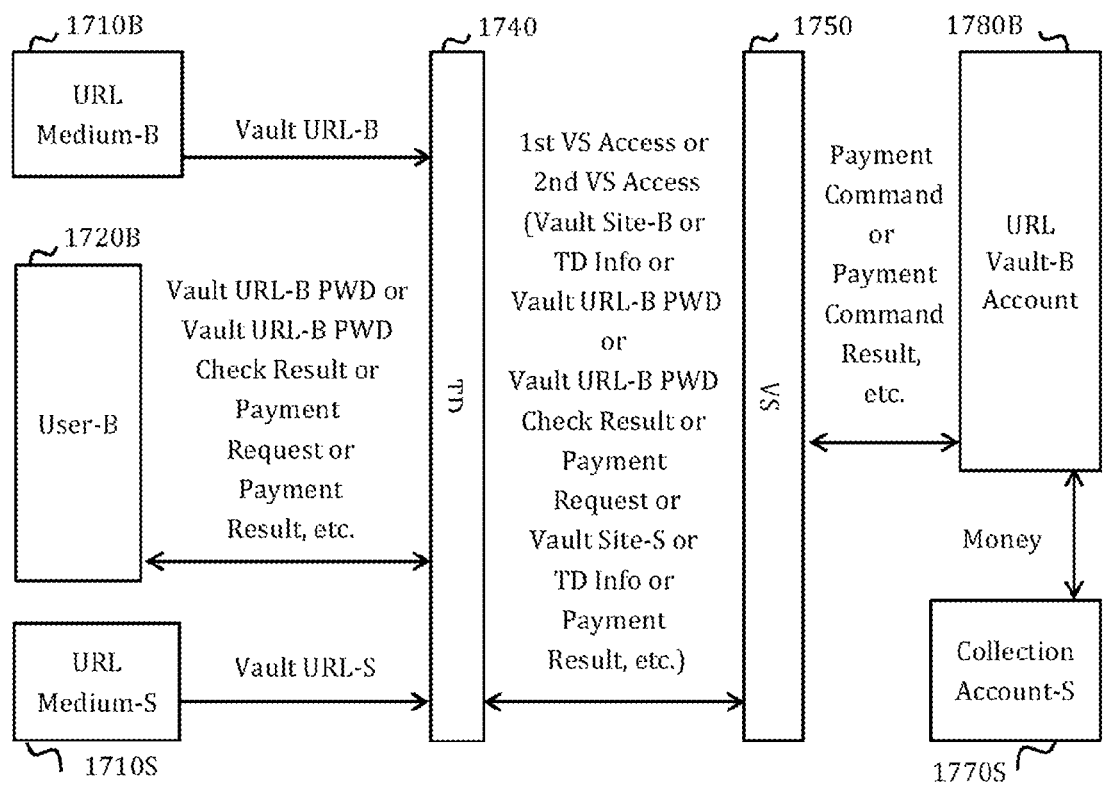
FIG. 17 is a block diagram of a system for paying with money stored in an external device rather than a URL medium by using two URL mediums and the Internet site in a face-to-face transaction confirming a user.
Figure 18:
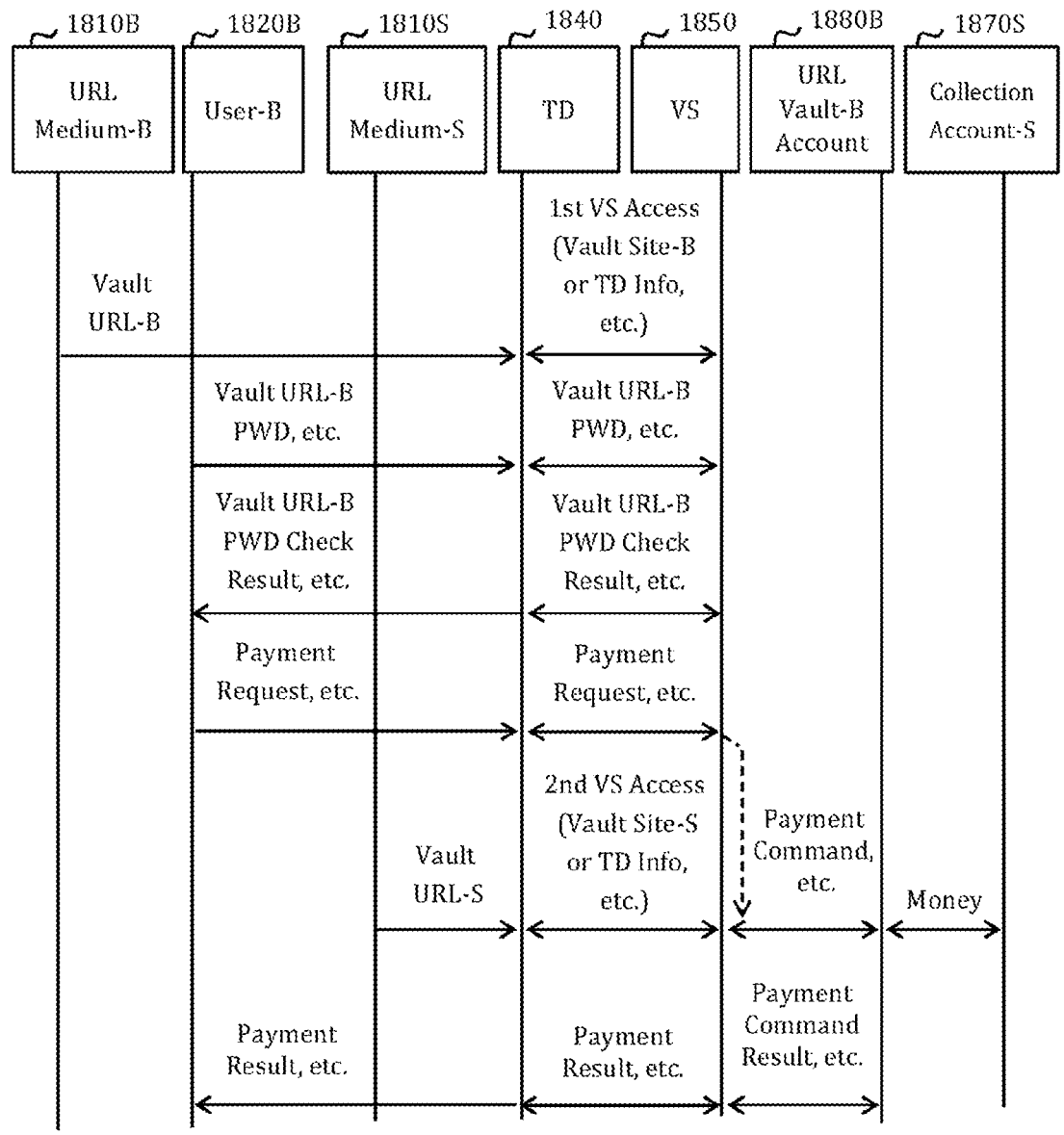
FIG. 18 is a flow diagram of method corresponding to the block diagram of FIG. 17.

<A Payment for Face-to-Face Transactions Using Two URL Mediums after Confirming a User-B, Refer to FIGS. 17 and 18>

A URL medium-B can store a vault URL-B, etc. or deliver the vault URLB to a TD.

A URL medium-S can store a vault URL-S, etc. or deliver the vault URL-S to a TD.

A TD can receive a vault URL-B from a URL medium-B, connect to a VS or a vault site-B in response to the vault URL-B, deliver TD info, etc. to the VS, deliver a vault URL-B PWD, etc. received from a user-B to the VS, deliver a vault URL-B PWD check result, etc. received from the VS to the user-B, deliver a payment request, etc. received from the user-B to the VS, receive a vault URL-S from a URL medium-S, connect to the VS or a vault site-S in response to the vault URL-S, or deliver a payment result, etc. received from the VS to the user-B.

A VS can connect to a TD in response to a vault URL-B, communicate a vault site-B or TD info, etc. with the TD, receive a vault URL-B PWD, etc. from the TD, deliver a vault URL-B PWD check result, etc. to the TD, receive a payment request, etc. from the TD, connect to the TD in response to a vault URL-S, deliver a payment command, etc. to a URL vault-B account, receive a payment command result, etc. from the URL vault-B account, or deliver a payment result, etc. to the TD.

A URL vault-B account can receive a payment command, etc. from a VS, deliver money to a collection account-S, or deliver a payment command result, etc. to the VS.

A collection account-S can collect money. A payment system (FIG. 17) can include a URL medium-B, a URL medium-S, a TD, a VS, a URL vault-B account, and a collection account-S, etc.

Step a) in which a TD receives a vault URL-B from a URL medium-B, connects to a VS or a vault site-B in response to the vault URL-B, delivers TD info, etc. to the VS, or delivers a vault URL-B PWD, etc. received from a user-B to the VS; the VS delivers a vault URL-B PWD check result, etc. to the TD; the TD delivers a vault URL-B PWD check result, etc. to the user-B or delivers a payment request, etc. received from the user-B to the VS; the VS manages the payment request, etc.; or the TD receives a vault URL-S from a URL medium-S or connects to the VS or a vault site-S in response to the vault URL-S.

Step b) in which the VS delivers a payment command, etc. to a URL vault-B account.

Step c) in which the URL vault-B account delivers money to a collection account-S.

Step d) in which the collection account-S receives the money; the URL vault-B account delivers a payment command result, etc. to the VS; the VS delivers a payment result, etc. to the TD; or the TD delivers the payment result, etc. to the user-B. A payment method (FIG. 18) can include the above steps and other steps.

A payment system (FIG. 17) or a payment method (FIG. 18) pays with money of a URL vault account (an external device rather than a URL medium), using a medium (URL medium) and an internet site (vault site).

FIGS. 15, 16, 17 and 18 are useful when there is no a URL POS.

<A Face-to-Face Payment System and Method Approving Temporarily, Refer to Drawings 19 and 20>

A URL medium can store a vault URL, etc. or deliver the vault URL to a URL POS.

A URL POS can receive a vault URL from a URL medium, approve in response to the vault URL, store the vault URL or a payment [approval] result, etc., or deliver the payment approval result, etc. to a user. A temporary payment approval system (FIG. 19) can include a URL medium, and a URL POS, etc.

Step a) in which a URL medium delivers a vault URL to a URL POS.

Step b) in which the URL POS approvals a payment in response to the vault URL, stores the vault URL or a payment [approval] result, etc., or delivers the payment [approval] result to a user. A temporary payment approval method (FIG. 20) can include the above steps and other steps.

A temporary payment approval system (FIG. 19) or a temporary payment approval method (FIG. 20) approvals temporarily a payment using a medium.

Figure 19:
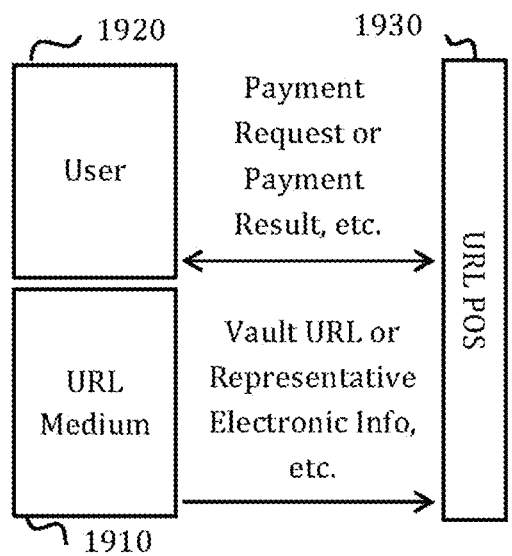
FIG. 19 is a block diagram of a system for paying with money stored in an external device rather than a URL medium by using the URL medium in a face-to-face transaction that temporarily approves payment.
Figure 20:
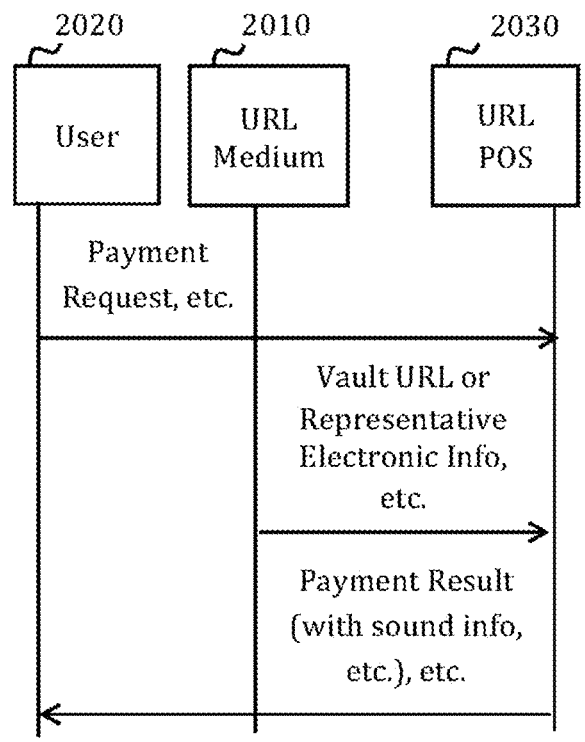
FIG. 20 is a flow diagram of method corresponding to the block diagram of FIG. 19.

FIGS. 19 and 20 are useful in cases where network connectivity is difficult and payments are made quickly or small payments are made repeatedly, such as transportation systems.

Figure 21:
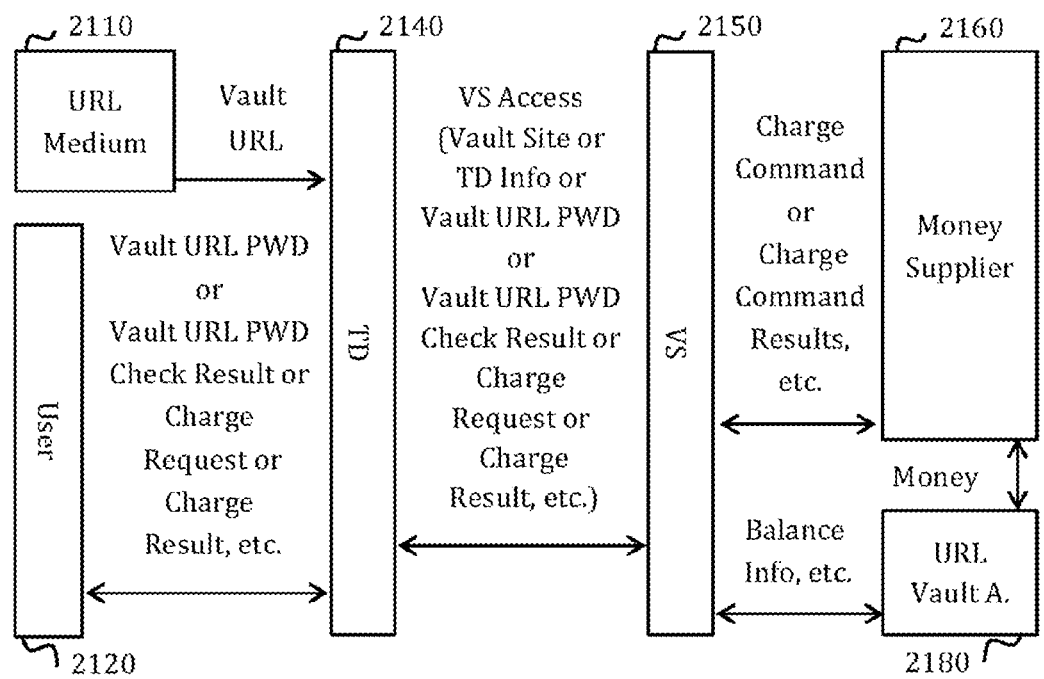
FIG. 21 is a block diagram of a non-face-to-face charging system in which a money supplier can store money in an external device (a URL vault account) rather than a URL medium after a VS confirms a user using a vault URL, a vault URL PWD, etc.
Figure 22:
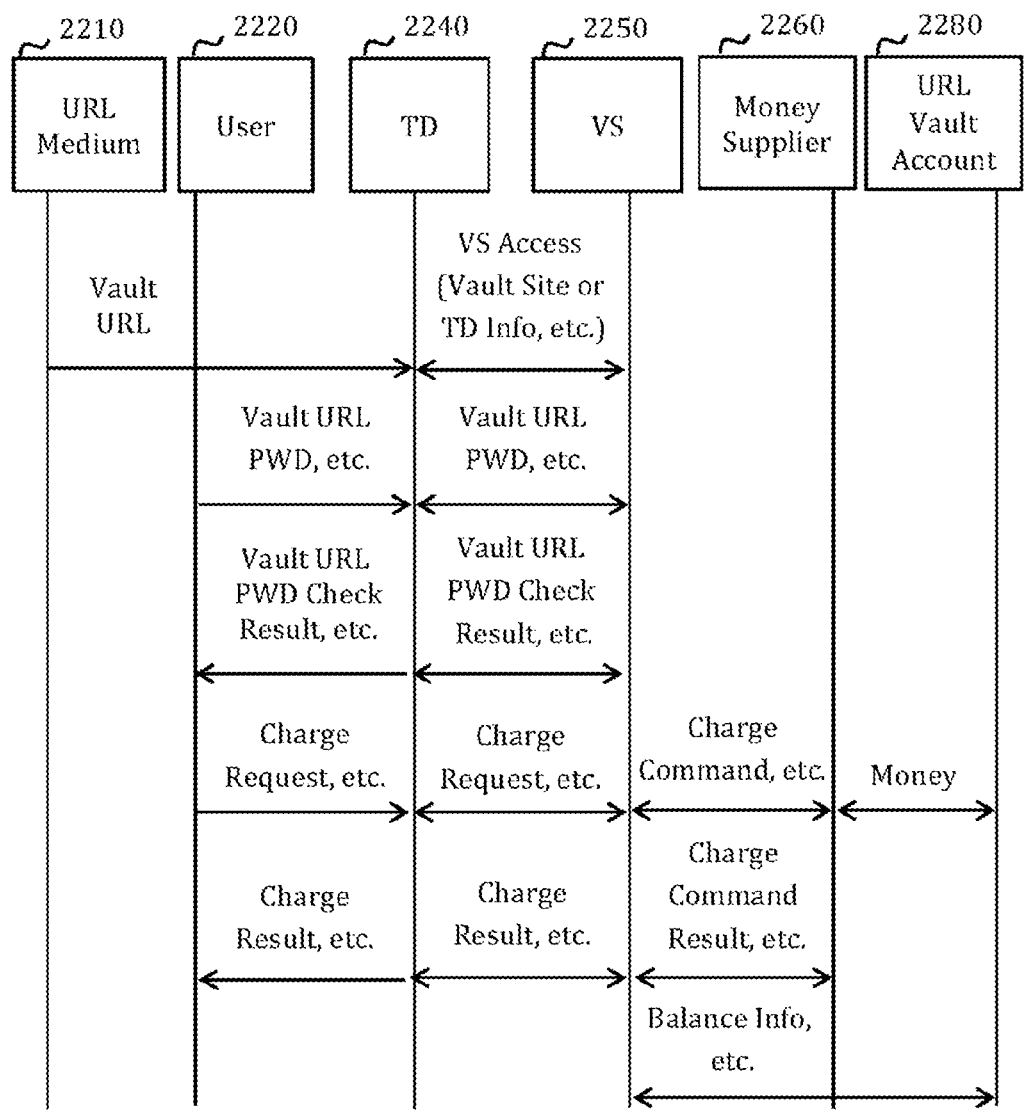
FIG. 22 is a flow diagram of method corresponding to the block diagram of FIG. 21.

<An Online Charging System and Method Receiving a Charge Request after Confirming a User, Refer to FIGS. 21 and 22>

A URL medium can store a vault URL, etc. or deliver the vault URL to a TD.

A TD can receive a vault URL from a URL medium, connect to a VS or a vault site in response to the vault URL or deliver TD info, etc. to the VS, deliver a vault URL PWD, etc. received from a user to the VS, deliver a vault URL PWD check result, etc. received from the VS to the user, deliver a charge request, etc. received from the user to the VS, or deliver a charge result, etc. received from the VS to the user.

A VS can connect to a TD in response to a vault URL, communicate a vault site or TD info, etc. with the TD, receive a vault URL PWD, etc. from the TD, deliver a vault URL PWD check result, etc. to the TD, receive a charge request, etc. from the TD, deliver a charge order, etc. to a money supplier, receive a charge order result, etc. from the money supplier, or deliver a charge result, etc. to the TD.

A money supplier can receive a charge order, etc. from a VS, deliver money to a URL vault account, or deliver a charge order result, etc. to the VS.

A URL vault account can be charged with money. A charging system (FIG. 21) can include a URL medium, a TD, a VS, a money supplier, and a URL vault account, etc.

Step a) in which a TD receives a vault URL from a URL medium, connects to a VS or vault site in response to the vault URL, delivers TD info, etc. to the VS, or delivers a vault URL PWD, etc. received from a user to the VS.

Step b) in which the VS delivers a vault URL PWD check result, etc. to the TD; the TD delivers a vault URL PWD check result, etc. to the user, or delivers a charge request, etc. received from the user to the VS; or the VS delivers a charge order (=charge command), etc. to a money supplier.

Step c) in which the money supplier delivers money to a URL vault account.

Step d) in which the URL vault account holds the money; the money supplier delivers a charge order result (=charge command result), etc. to the VS; the VS delivers a charge result, etc. to the TD; or the TD delivers the charge result, etc. to the user. A charging method (FIG. 22) can include the above steps and other steps.

In a charging system (FIG. 21) or a charging method (FIG. 22), a URL vault account (an external device rather than a URL medium) can hold money, using a medium (URL medium) and an internet site (vault site).

<A Charging Agency System and Method. A Face-to-Face Charging Agency System and Method that Money is Paid to a Third Party and the Third Party Performs Charging Service as an Agent, Refer to FIGS. 23 and 24>

A URL medium can store a vault URL, etc. or deliver the vault URL to a URL POS.

A URL POS can receive money or a charge agency request, etc. from a user, receive a vault URL from a URL medium, connect to a VS in response to the vault URL, deliver URL POS info or the charge agency request, etc. to the VS, or deliver a charge agency result, etc. received from the VS to the user.

A VS can connect to a URL POS in response to a vault URL, receive URL POS info or a charge agency request, etc. from the URL POS, deliver a charge order (=charge command), etc. to a money supplier, receive a charge order result (=charge command result), etc. from the money supplier, or deliver a charge agency result, etc. to the URL POS.

A money supplier can receive a charge order, etc. from a VS, deliver money to a URL vault account, or deliver a charge order result, etc. to the VS.

A URL vault account can be charged with money. A charge agency system (FIG. 23) can include a URL medium, a URL POS, a VS, a money supplier, and a URL vault account, etc.

Step a) in which a URL POS receives money or a charge agency request, etc. from a user, receives a vault URL from a URL medium, connects to a VS in response to the vault URL, or delivers URL POS info or the charge agency request, etc. to the VS.

Step b) in which the VS connects to the URL POS or delivers a charge order (=charge command), etc. to a money supplier.

Step c) in which the money supplier delivers money to a URL vault account.

Step d) in which the URL vault account is charged with money; the money supplier delivers a charge order result, etc. to the VS; the VS delivers a charge agency result, etc. to the URLPOS; or the URL POS delivers the charge agency result, etc. to the user. A charge agent method (FIG. 24) can include the above steps and other steps.

In a charge agent system (FIG. 23) or a charge agent method (FIG. 24), a URL vault account (an external device rather than a URL medium) can hold money, using a medium (URL medium) and the Internet.

Figure 23:
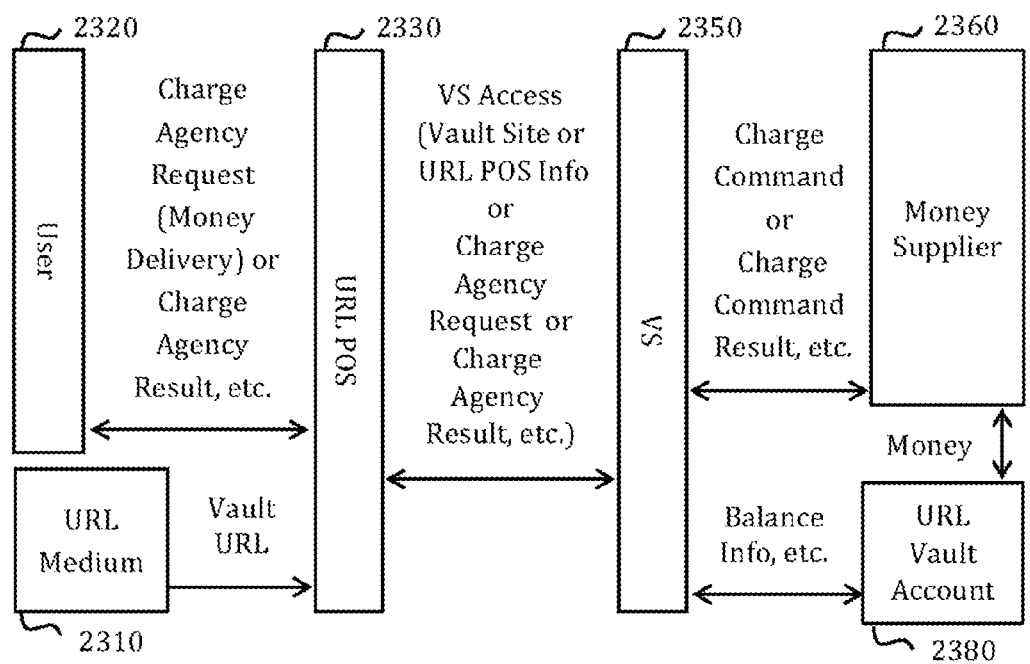
FIG. 23 is a block diagram of a face-to-face charging system where a URL POS and a VS can act as an agent storing money of a money supplier in an external device (URL vault account) rather than a URL medium in response to a charge agency request of a user and a vault URL of the URL medium.
Figure 24:
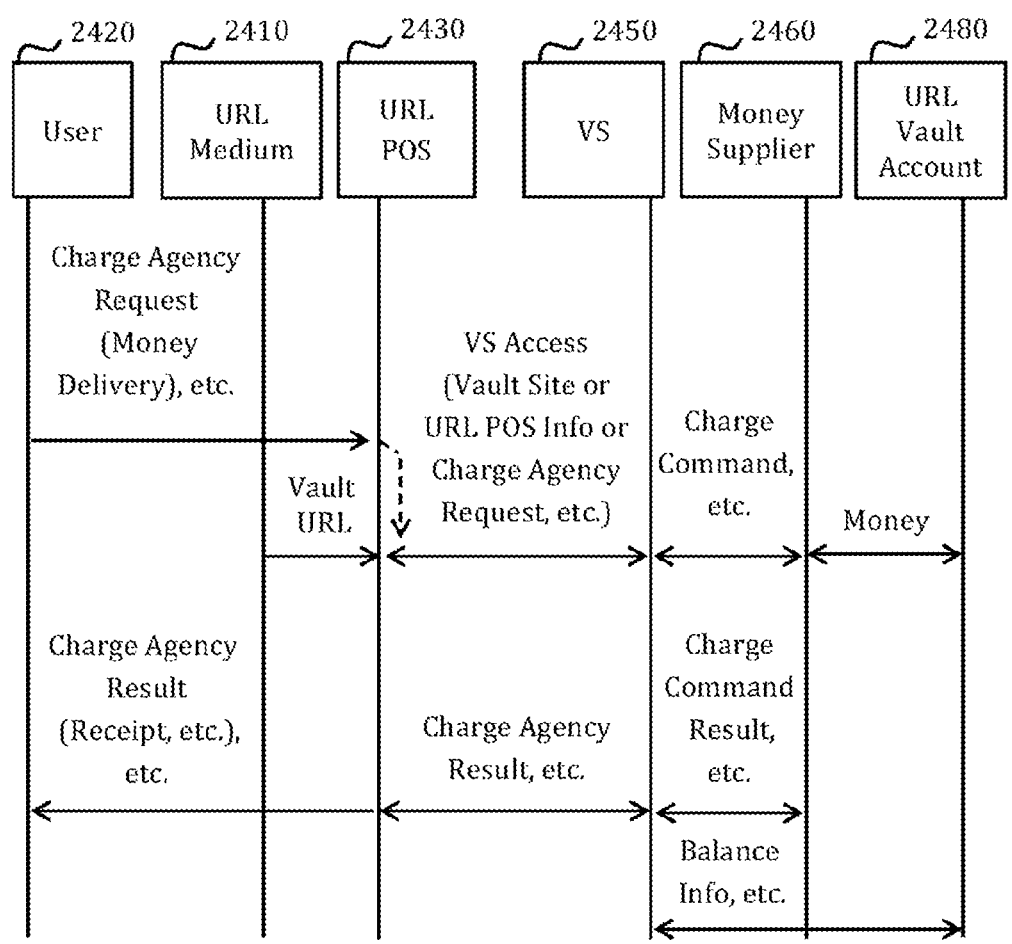
FIG. 24 is a flow diagram of method corresponding to the block diagram of FIG. 23.

In the situation of FIGS. 23 and 24, a convenience store, etc. can receive cash, etc. The convenience store can support charging.

Figure 25:
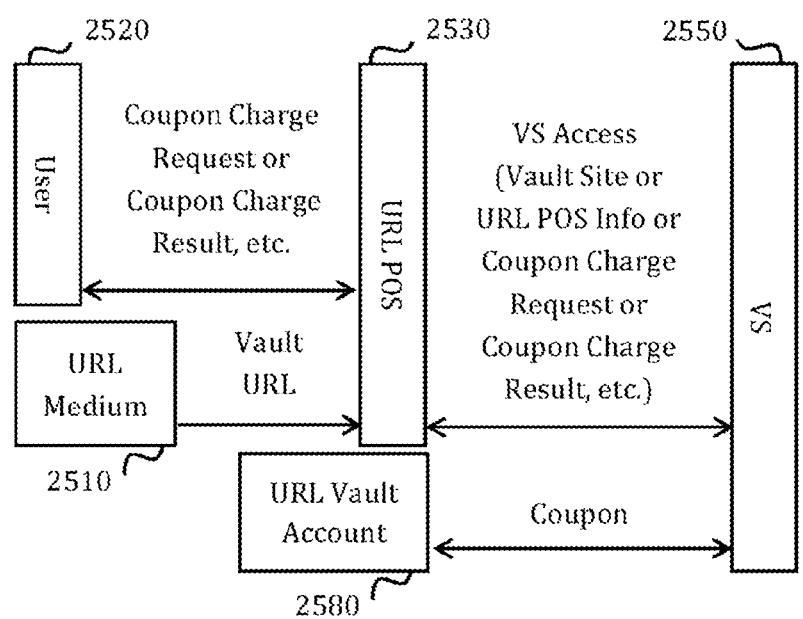
FIG. 25 is a block diagram of a face-to-face charging system where a URL POS and a VS can store a coupon in an external device (URL vault account) rather than a URL medium in response to a coupon charge request of a user and a vault URL of the URL medium.
Figure 26:
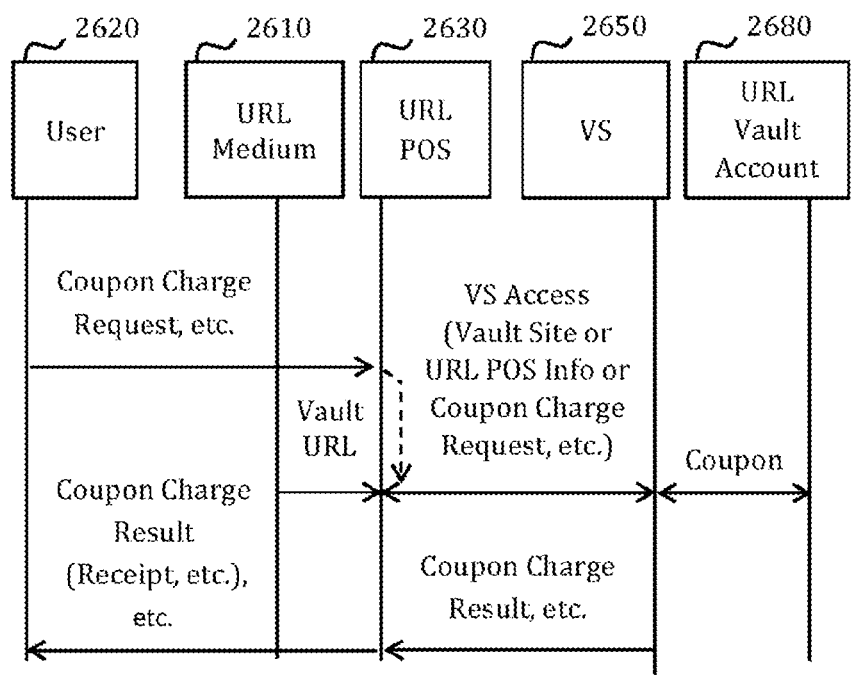
FIG. 26 is a flow diagram of method corresponding to the block diagram of FIG. 25.

<An Offline System and Method that Charges Coupons Generated by Transactions, Etc., Refer to FIGS. 25 and 26>

A URL medium can store a vault URL, etc. or deliver the vault URL to a URL POS.

A URL POS can receive a coupon charge request, etc. from a user, receive a vault URL from a URL medium, connect to a VS in response to the vault URL, deliver URL POS info or the coupon charge request, etc. to the VS, or deliver a coupon charge result, etc. received from the VS to the user.

A VS can connect to a URL POS in response to a vault URL, receive URL POS info or a coupon charge request, etc. from the URL POS, deliver a coupon to a URL vault account, or deliver a coupon charge result, etc. to the URL POS.

A URL vault account can collect a coupon (money). A offline coupon charge system (FIG. 25) can include a URL medium, a URL POS, a VS, and a URL vault account, etc.

Step a) in which a URL POS receives a coupon charge request, etc. from a user, receives a vault URL from a URL medium, connects to a VS in response to the vault URL, or delivers URL POS info or the coupon charge request, etc. to the VS.

Step b) in which the VS connects to the URL POS or delivers a coupon to a URL vault account.

Step c) in which the URL vault account collects the coupon.

Step d) in which the VS delivers a coupon charge result, etc. to the URL POS; or the URL POS delivers the coupon charge result, etc. to the user. An offline coupon charge method (FIG. 26) can include the above steps and other steps.

In an offline coupon charge system (FIG. 25) or an offline coupon charge method (FIG. 26), a URL vault account (an external device rather than a URL medium) can hold money (coupon), using a medium (URL medium) and the Internet.

FIGS. 25 and 26 are useful for using a charging service by using coupons generated in offline transactions. A coupon charge request can include coupons generated in transactions.

Figure 27:
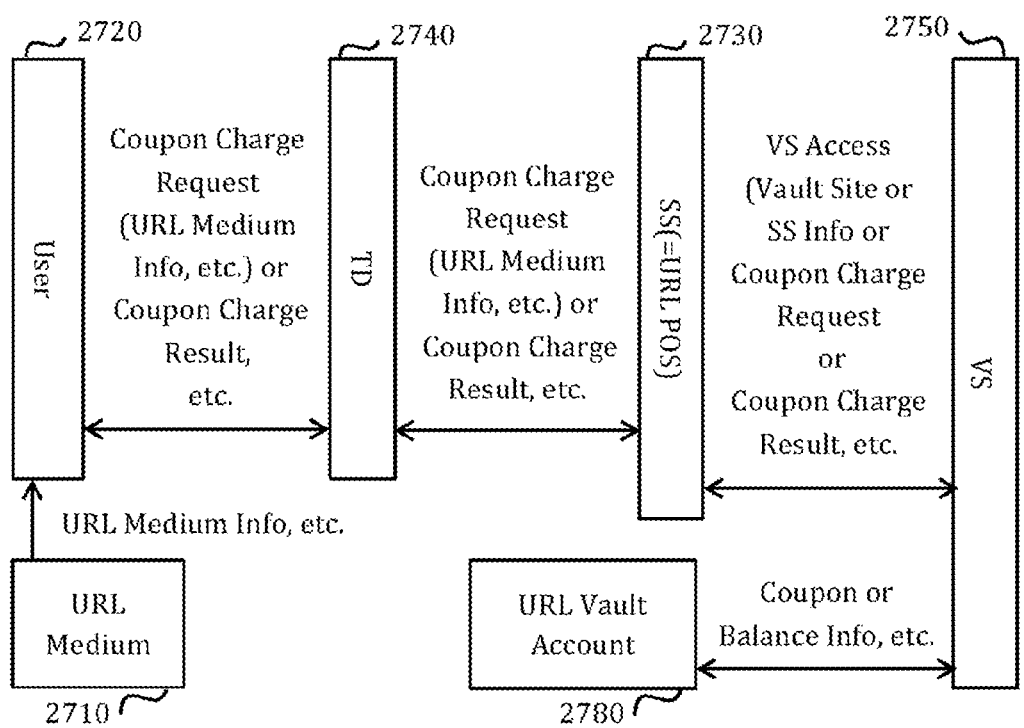
FIG. 27 is a block diagram of a non-face-to-face charging system where a TD, a SS, and a VS can store a coupon in an external device (URL vault account) other than a URL medium in response to a user's a coupon charge request including a URL medium information of the URL medium.
Figure 28:
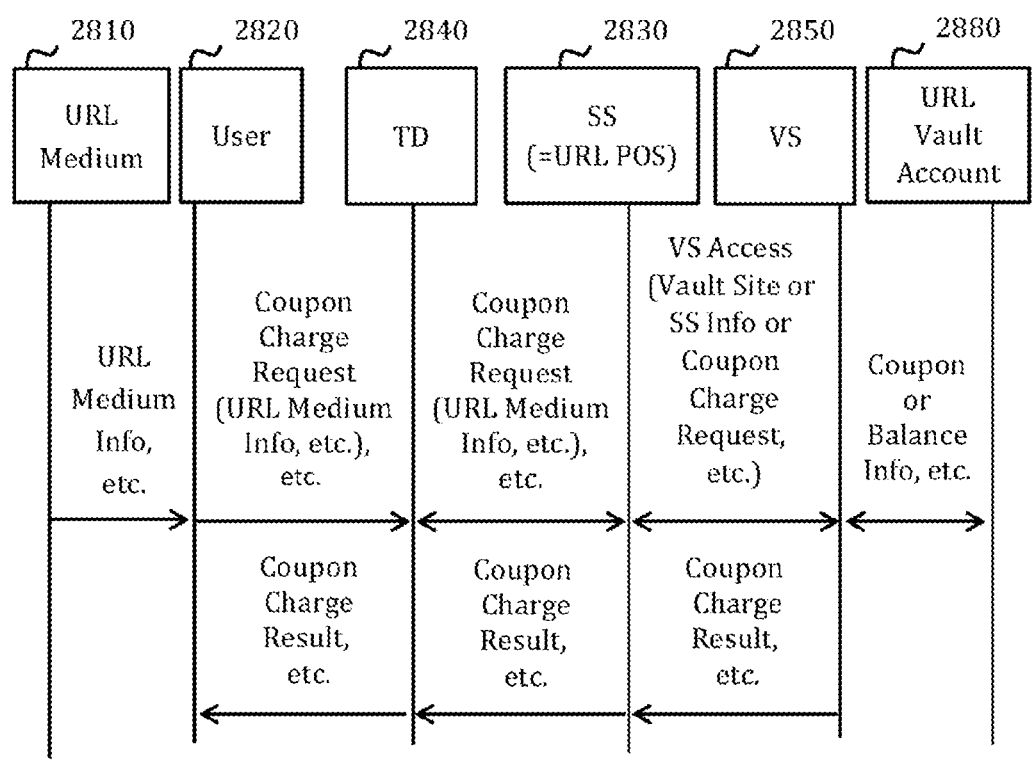
FIG. 28 is a flow diagram of method corresponding to the block diagram of FIG. 27.

<An Online System and Method that Charges Coupons Generated by Transactions, Etc., Refer to FIGS. 27 and 28>

A URL medium can store URL medium info, etc. or deliver the URL medium info to a user.

A TD can deliver a coupon charge request including URL medium info, etc. received from a user to a SS or deliver the coupon charge result, etc. to the user.

A SS can receive a coupon charge request, etc. from a TD, connect to a VS or a vault site in response to URL medium info of the coupon charge request, deliver SS info or the coupon charge request, etc. to the VS, or deliver a coupon charge result, etc. received from the VS to the TD.

A VS can connect to a SS, receive SS info or a coupon charge request, etc. from the SS, deliver a coupon to a URL vault account, or deliver a coupon charge result, etc. to the SS.

A URL vault account can collect money. An online coupon charge system (FIG. 27) can include a URL medium, a TD, a SS, a VS, and a URL vault account, etc.

Step a) in which a TD delivers a coupon charge request including URL medium info, etc. received from a user to a SS.

Step b) in which the SS connects to a VS or a vault site in response to the URL medium info, or delivers SS info or the coupon charge request, etc. to the VS.

Step c) in which the VS connects to the SS or delivers money to a URL vault account.

Step d) in which the URL vault account collects money.

Step e) in which the VS delivers a coupon charge result, etc. to the SS.

Step f) in which the SS delivers the coupon charge result, etc. to the TD. Or step g) in which the TD delivers the coupon charge result to the user. An online coupon charge method (FIG. 28) can include the above steps and other steps.

In an online coupon charge system (FIG. 27) or an online coupon charge method (FIG. 28), a URL vault account (an external device rather than a URL medium) can hold money (coupon), using a medium (URL medium) and an internet site (vault site).

A coupon charge request can include URL medium info, or a coupon, etc.

FIGS. 27 and 28 are useful for using services storing coupons generated in online transactions.

(A URL medium payment process) In a payment request process, a URL medium payment process delivers a vault URL or information to a VS through the Internet. In user check process, a URL medium payment process checks a user with a vault URL or a vault URL PWD, etc. In remittance process, a URL medium payment process delivers money from a URL vault account to a collection account.

<About the Terms of the Present Invention>

(URL medium) A URL medium is a kind of medium storing a vault URL. A URL medium-B or a URL medium-S is a kind of URL medium. A URL medium-B's a vault URL-B and a URL medium-S's a vault URL-S are different.

A URL medium can further store or include URL medium info, or representative electronic information, etc. A vault URL PWD, etc. corresponding to a URL medium may be set. A URL medium does not store money internally, and can provide a vault URL, URL medium info, or representative electronic information, etc. to an external device. A URL medium can support connecting to a VS or a vault site, paying with money of a URL vault account, or charging money to a URL vault account. A URL medium does not store a vault URL PWD internally, does not have a function to check a vault URL PWD, or can provide information designating a collection account for collecting money. A URL medium does not store 'CC info' or 'a QR code'.

(URL medium info, Representative electronic information) URL medium info is non-electronic information (e.g., serial number, etc.) corresponding to a URL medium or a vault URL, or can be displayed on the surface of a URL medium, etc. URL medium info can support connecting to a VS or a vault site. Representative electronic information is electronic information (e.g., serial number, etc.) corresponding to a URL medium or a vault URL. Representative electronic information can support connecting to a VS or a vault site.

(User) A user owns a URL medium and a user-B owns a URL medium-B.

(URL vault account) A URL vault account can store money corresponding to a URL medium. Examples of a URL vault account can include a bank account or a coupon store, etc.

A URL vault account can store money or transfer the money or balance information, etc. to an external device.

(Vault site) A vault site is an internet site that can support paying with money of a URL vault account or charging money into a URL vault account. A vault site-B or a vault site-S is a kind of vault site.

A vault site can support an access of a vault URL, URL medium info, or representative electronic information. A vault site can support a vault URL PWD, can support logging in with a vault URL, or a vault URL PWD, etc., can support various transactions, charging, or additional services, etc., and can include advertisements.

(VS=Vault Server) A VS is a kind of web server that supports paying with money of a URL vault account or charging money into a URL vault account. A VS can exercise overall control everything needed for payment or charging.

A VS can provide a vault site or additional services, store a vault URL PWD, and determine login with a vault URL or a vault URL PWD, etc. A VS can execute a payment request process, a user check process, and a remittance process, support various transactions or charging, etc., and communicate with an external server, etc. A VS can receive money (coupon, etc.) from an external device, and support storing money in a URL vault account, etc.

(Vault URL) A vault URL is a kind of URL that can support connecting to a VS or a vault site. A vault URL-B or a vault URL-S is a kind of vault URL.

A vault URL can support connecting to other things, and can include representative electronic information, etc. A vault URL may be stored in a URL medium in the form of electronic information or images, etc., and may be used as a user ID. A vault URL can be used with a vault URL PWD, etc. to support logging into a VS or can designate a collection account.

(Money supplier) A money supplier can supply money, etc. to a URL vault account, etc. A money supplier includes a bank account, a securities account, a credit card, a collection account, or a VS, etc. A URL vault account may be a money supplier for other URL vault accounts.

A money supplier can automatically transfer money to a URL vault account, etc.

(Collection account) A collection account can receive money, etc. A collection account includes a bank account, etc., and a collection account-S is a collection account corresponding to a vault URL-S.

(TD=Terminal Device) A TD is a terminal device that has functions to communicate with a URL medium, communicate information with a user, connect to the Internet, or other functions.

A smart phone is a representative TD, and a PC, a wall pad, or a TV with a function of communicating with a URL medium may also be a TD.

A TD of the present invention does not require a USIM or an app. For payment, at the same time one TD can connect to a sales site and another TD can connect to a VS or a vault site. A TD can act as a URL POS.

(TD info or TD information) TD info is information held by a TD, such as a TD's IP, a OS serial number, a MAC address, or an International Mobile Equipment Identity (IMEI). TD info can be transmitted to an external device, or can be used as information to confirm a TD, or a user, etc.

(URL POS) A URL POS or a URL POS system is a store sales system or a point-of-sale information management system that can manage sales information, etc., consisting of sales devices, or sales functions, etc. The URL POS may consist of an ordering device, a charging device, a credit card payment device, a device that communicates with a URL medium, a balance check device (a device that checks a balance of a URL vault account), or a management computer. The URL POS may include a SS (=Sales Server) or an operating software. The URLPOS may include a ticket machine, a washing machine, or a car wash with a URL medium payment.

A URL POS can support using internal menus or VS menus, and delivering information for a payment, a charging, or a system operating to a VS.

(URL POS info or URL POS information) URL POS info is information that a URL POS holds, such as a URL POS's IP, a OS serial number, a MAC address, or a device identification information (IMEI: International Mobile Equipment Identity). URL POS info can be transmitted to an external device, or can be used as information to check a URL POS or an operator of a URL POS.

(Money) Money has economic value. Money can include a coupon, etc. issued by a VS, or a SS, etc.

(Vault URL PWD) A vault URL PWD is secret information that can support paying with money of a URL vault account or charging money into a URL vault account. A vault URL PWD may be set in response to a URL medium, a vault site, or a vault URL, etc.

A vault URL PWD may be remembered by a user, used as information for logging into a VS and confirming a user.

(Vault URL PWD check result) A vault URL PWD check result is a result of checking a vault URL PWD, or a vault URL, TD info, etc.

(Comparison among a CCC server, a app server, and a VS) A CCC server is composed of a CCP server that supports a payment request process and a remittance process in response to CC info, and a CCW server that supports a user check process in response to a CC URL. A CCC server supports paying with money of a CC Account. A CCC server does not support charging. A app server is a kind of app server that, using a app&SP and a app, supports paying with money of an external device rather than a app&SP and charging money into an external device rather than a app&SP. A VS is a kind of web server that, using a URL medium and a vault site, etc., supports paying with money of an external device rather than a URL medium and charging money into an external device rather than a URL medium.

An order # is a number representing an order. An order # can be used for designating order details, etc.

Order details can include item information or price information, etc. Order details can be included in a payment request.

An order confirmation is confirming order details, etc., and can include related information.

A payment reservation (=a payment schedule) is for the thing scheduling the payment. A payment reservation can include related information.

A payment request is the thing paying with money of a URL vault account, and can include related information.

A payment request can include URL medium info, representative electronic information, or order details, etc. The payment request does not include a CC info or a QR code.

A payment command is an order to let paying with money of a URL vault account, and can include related information.

A payment command result is a result that has executed a payment command, and can include related information.

A payment result is a result that has executed a payment request, can include related information, and can be delivered through a vault site or a text message.

A charge request is the thing that requests storing money into a URL vault account, can include related information (URL medium info, representative electronic information, or money information, etc.), and can be automatically executed by presetting.

A charge result is a result that has charged, can include related information, and can be delivered through a vault sites or a text message.

A charge order is an order to let storing money into a URL vault account, and can include related information.

A charge order result is a result that has executed a charge order and can include related information.

A charge agency request is a request for a third party to charge money into a URL vault account, and can include "delivering money to the third party" and include related information.

A charge agency result is a result that has executed a charge agency request, can include related information, and can be delivered through a vault site or a text message.

The access is the thing that two or more devices access, and it is possible to access the same device sequentially twice for the same purpose.

A access command is an order to let accessing, and can include related information.

A sales site is an internet site that sells goods or services, etc.

An advertisement means all information or contents other than information related to a payment or a charging.

(Features and advantages of a URL medium payment) a) A URL medium payment stores money in a URL vault account. b) A URL medium payment can deliver a vault URL or information, etc. to a vault site or a VS in a payment request process. c) A URL medium payment can deliver a vault URL PWD, etc. to a VS in a user check process. d) A URL medium payment transfers money from a URL vault account to a collection account in a remittance process. e) In a URL medium payment, a payment request process and a user check process can be exchanged each other. f) Since a URL medium payment uses only one type of information (vault URL), a production cost of a medium (URL medium) is low. g) In a URL medium payment, a payment request path and a user check path are different, but information (a vault URL) used for the two paths is the same. h) A URL medium can charge money in a URL vault account. i) A URL medium payment can support various transactions. j) For a URL medium payment, a commission is cheap or no commission. k) A URL medium payment can structurally prevent hackings. l) For a URL medium payment, a balance is protected even if a URL medium is lost. m) A URL medium payment is advantageous in creating added value using an internet site because entire payment processes ("a payment request process", "a user check process" and "a remittance process") use the same path (=an internet site). n) A URL medium payment can support a payment without a user's a smart phone. o) For a URL medium payment, there is no information leakage even if a smart phone is lost. p) A URL medium payment can reflect changes in service or content in real time. q) A URL medium payment does not require a credit card system and an app.

Explanation of the Sign 110-1, 110-2, 110-3, 110-4: RF card (Medium for RF Card Payment)
120-1, 120-2, 120-3, 120-4: User
130-1, 130-2: RF Card Charger
140-3, 140-4: RF Card Payment Machine
210, 310: URL-NFC CC (=Medium for URL-NFC CC payment)
220, 320: User
230, 330: CC POS
240, 340: TD
250, 350: CCC Server (=CCP Server+CCW Server)
270, 370: Collection Account
280, 380: CC Account
410-1, 410-2: App&SP (=Medium for App&SP Payment)
420-1, 420-2: User
430-1, 430-2: App POS
450-1, 450-2: App Server
470-1, 470-2: Collection Account
480-1, 480-2: App&SP Account
510, 610, 710, 810, 910, 1010, 1110, 1210, 1310, 1410, 1510B, 15105, 1610B, 1610S, 1710B, 1710S, 1810B, 1810S, 1910, 2010, 2110, 2210, 2310, 2410, 2510, 2610, 2710, 2810: URL Medium, or URL Medium-B, or URL Medium-S
520, 620, 720, 820, 920, 1020, 1120, 1220, 1320, 1420, 1520B, 1620B, 1720B, 1820B, 1920, 2020, 2120, 2220, 2320, 2420, 2520, 2620, 2720, 2820: User, or User-B
530, 630, 730, 830, 930, 1030, 1130, 1230, 1330, 1430, 1930, 2030, 2330, 2430, 2530, 2630, 2730, 2830: URL POS or SS
740, 840, 940, 1040, 1140, 1240, 1340, 1440, 1540, 1640, 1740, 1840, 2140, 2240, 2740, 2840: TD
550, 650, 750, 850, 950, 1050, 1150, 1250, 1350, 1450, 1550, 1650, 1750, 1850, 2150, 2250, 2350, 2450, 2550, 2650, 2750, 2850: VS
2160, 2260, 2360, 2460: Money Supplier
570, 670, 770, 870, 970, 1070, 1170, 1270, 1370, 1470, 1570S, 1670S, 1770S, 1870S: Collection Account, or Collection Account-S
580, 680, 780, 880, 980, 1080, 1180, 1280, 1380, 1480, 1580B, 1680B, 1780B, 1880B, 2180, 2280, 2380, 2480, 2580, 2680, 2780, 2880: URL vault account, or URL vault-B account

What is claimed is:

1. An offline payment method that delivers money from an uniform resource locator (URL) vault account to a collection account in response to a payment command of a vault server (VS) receiving an order confirmation of a user from a terminal device TD after receiving a URL medium's a vault URL and a payment request from a URL point of sale (POS), the offline payment method comprising:

the URL medium is a medium that stores the vault URL including ID of the user in a near field communication (NFC) chip to use an NFC, and the URL medium delivers the vault URL to the URL POS through NFC during payment request process and delivers the vault URL to the TD through NFC during user check process;

the URL POS is a POS for offline payment that has an NFC chip to receive the vault URL from the URL medium and includes a function of exchanging information with a seller or the user, a function of receiving the vault URL from the URL medium through NFC, a function of delivering the vault URL and the user's the payment request to the VS, and a function of communicating information with the VS, and the URL POS receives the payment request including order details from the user, receives the vault URL from the URL medium through NFC, delivers the vault URL, the payment request, and URL POS information to the VS corresponding to the vault URL, and delivers a payment result of the VS to the user;

the TD is a terminal that has an NFC chip to receive the vault URL from the URL medium and includes a user interface (UI) function, a function of receiving the vault URL from the URL medium through NFC, a function of accessing the VS in response to the vault URL, and a function of communicating information or a vault site corresponding to the vault URL with the VS, and the TD receives the vault URL from the URL medium through NFC, connects to the VS in response to the vault URL, communicates TD information and the vault site with the VS or the user, delivers the user's vault URL password (PWD) to the VS through the vault site, delivers the VS's a vault URL PWD check result and the order details to the user through the vault site, delivers the user's order confirmation to the VS through the vault site, and delivers the VS's the payment result to the user via the vault site;

the VS is a server that has vault sites and includes a function of communicating information with the URL POS, a function of connecting to the TD, a function of communicating the vault site or information with the TD, a function of generating the vault URL PWD check result or the payment command, and a function communicating information with the URL vault account, and the VS connects to the URL POS in response to the vault URL, receives the vault URL, the payment request, and the URL POS information from the URL POS, connects to the TD in response to the vault URL, communicates the vault site and the TD information with the TD, receives the vault URL PWD from the user through the vault site, checks the vault URL and the vault URL PWD and/or the TD information to generate the vault URL PWD check result, delivers the vault URL PWD check result and the order details to the user through the vault site, receives the user's order confirmation through the vault site, generates the payment command in response to the order confirmation and the payment request, delivers the payment command to the URL vault account corresponding to the vault URL, receives a payment command result from the URL vault account, and delivers the payment result corresponding to the payment command result to the URL POS or the TD;

the URL vault account is a device that holds money of the user and includes a function of communicating information with the VS and transferring money to the collection account, and the URL vault account receives the payment command from the VS, delivers the money in response to the payment command with the URL POS information to the collection account corresponding to the URL POS information, and transfers the payment command result to the VS; and the collection account is an account corresponding to the URL POS information, and the collection account collects the money from the URL vault account.

2. An offline payment method that delivers money from an uniform resource locator (URL) vault account to a collection account in response to a payment command of a vault server (VS) receiving a vault URL of a URL medium and a payment request from a URL point of sale (POS) after receiving a user's a payment schedule from a terminal device (TD), the offline payment method comprising:

the URL medium is a medium that stores the vault URL including ID of the user in a near field communication (NFC) chip to use an NFC, and the URL medium delivers the vault URL to the TD through NFC during user check process and delivers the vault URL to the URL POS through NFC during payment request process;

the TD is a terminal that has an NFC chip to receive the vault URL from the URL medium and includes a user interface (UI) function, a function of receiving the vault URL from the URL medium through NFC, a function of accessing the VS in response to the vault URL, and a function of communicating a vault site or information with the VS, and the TD connects to the VS in response to the vault URL received from the URL medium through NFC, communicates TD information and the vault site corresponding to the vault URL with the VS or the user, delivers the user's vault URL PWD to the VS through the vault site, delivers the VS's vault URL PWD check result to the user through the vault site, delivers the user's payment schedule to the VS through the vault site, and delivers a payment result received from the VS to the user;

the URL POS is a POS for offline payment that has an NFC chip to receive the vault URL from the URL medium and includes a function of exchanging information with a seller or the user, a function of receiving the vault URL from the URL medium through NFC, a function of delivering the vault URL and the user's the payment request to the VS, and a function of communicating information with the VS, and the URL POS receives the payment request from the user, receives the vault URL from the URL medium through NFC, delivers the vault URL, the payment request, and/or URL POS information to the VS corresponding to the vault URL, and delivers the payment result received from the VS to the user;

the VS is a server that has vault sites and includes a function of connecting to the TD, a function of communicating the vault site or information with the TD, a function of generating the vault URL password (PWD) check result, a function of communicating information with the URL POS, a function of generating the payment command, and a function communicating information with the URL vault account, and the VS connects to the TD in response to the vault URL, communicates the vault site and/or the TD information with the TD, receives the user's vault URL PWD through the vault site, checks the vault URL and the vault URL PWD and/or the TD information to generate the vault URL PWD check result, delivers the vault URL PWD check result to the user through the vault site, receives the user's payment schedule through the vault site, connects to the URL POS in response to the vault URL, receives the vault URL, the payment request, and/or the URL POS information from the URL POS, generates the payment command in response to the payment schedule and the payment request, delivers the payment command to the URL vault account corresponding to the vault URL, receives a payment command result corresponding to the payment command from the URL vault account, and delivers the payment result corresponding to the payment command result to the TD or the URL POS;

the URL vault account is a device that holds money of the user and includes a function of communicating information with the VS and transferring money to the collection account, and the URL vault account receives the payment command from the VS, delivers the money in response to the payment command with the URL POS information to the collection account corresponding to the URL POS information, and transfers the payment command result to the VS; and the collection account is an account corresponding to the URL POS information, and the collection account collects the money from the URL vault account.

3. An online payment method that delivers money from an uniform resource locator (URL) vault account to a collection account in response to a payment command of a vault server (VS) receiving an order confirmation of a user from a terminal device (TD) after receiving a payment request including URL medium information corresponding of a URL medium's a vault URL from a sales server (SS) the online payment method comprising:

the URL medium is a medium that stores the vault URL including ID of the user in a near field communication (NFC) chip to use an NFC and includes the URL medium information and the URL medium provides the URL medium information to the user during payment request process and delivers the vault URL to the TD through NFC during user check process;

the TD is a terminal that has an NFC chip to receive the vault URL from the URL medium and includes a user interface (UI) function, a function of accessing the SS, a function of communicating a sales site or information with the SS, a function of receiving the vault URL from the URL medium through NFC, a function of accessing the VS, and a function of communicating a vault site or information with the VS, and the TD connects to the SS in response to a SS access command of the user, communicates the sales site with the SS or the user, delivers the payment request including the URL medium information or order details received from the user to the SS through the sales site, receives the vault URL from the URL medium through NFC, connects to the VS in response to the vault URL, communicates TD information and/or the vault site corresponding to the vault URL with the VS or the user, delivers a vault URL PWD received from the user to the VS through the vault site, delivers the VS's a vault URL PWD check result and the order details to the user through the vault site, delivers the order confirmation received from the user to the VS through the vault site, and delivers a payment result received from the VS or the SS to the user;

the SS is a sales server for online payment that has sales sites and includes a function of connecting to the TD, a function of communicating the sales site or information with the TD, a function of including the URL medium information in the payment request, and a function of communicating information with the VS, and the SS connects to the TD in response to the SS access command, communicates the sales site with the TD, receives the payment request including the URL medium information and the order details through the sales site, delivers the payment request or SS information to the VS in response to the URL medium information, and delivers the payment result received from the VS to the TD;

the VS is a server that has vault sites and includes a function of communicating information with the SS, a function of connecting to the TD, a function of communicating the vault site or information with the TD, a function of generating the vault URL password (PWD) check result and/or the payment command, and a function of communicating information with the URL vault account, and the VS connects to the SS in response to the URL medium information, receives the payment request or the SS information from the SS, connects to the TD in response to the vault URL, communicates the vault site or the TD information with the TD, receives the vault URL PWD from the user through the vault site, checks the vault URL and the vault URL PWD and/or the TD information to generate the vault URL PWD check result, delivers the vault URL PWD check result and the order details to the user through the vault site, receives the order confirmation from the user through the vault site, generates the payment command in response to the payment request and the order confirmation, delivers the payment command to the URL vault account corresponding to the vault URL, receives a payment command result from the URL vault account, and delivers the payment result corresponding to the payment command result to the SS or the TD;

the URL vault account is a device that holds money of the user and includes a function of communicating information with the VS and transferring money to the collection account, and the URL vault account receives the payment command with the URL POS information from the VS, delivers the money in response to the payment command to the collection account corresponding to the SS information, and transfers the payment command result to the VS; and the collection account is an account corresponding to the SS information and the collection account collects the money from the URL vault account.

4. An offline payment method that delivers money from an uniform resource locator (URL) vault account to a collection account in response to a payment command of a vault server (VS) receiving a vault URL of a URL medium and a payment request from a URL point of sale (POS), the offline payment method comprising:

the URL medium is a medium that stores the vault URL including ID of a user in anear field communication (NFC) chip to use an NFC, and the URL medium delivers the vault URL to the URL POS through NFC during payment request process;

the URL POS is a POS for offline payment that has an NFC chip to receive the vault URL from the URL medium and includes a function of exchanging information with a seller or the user, a function of receiving the vault URL from the URL medium through NFC, a function of delivering the vault URL and the user's the payment request to the VS, and a function of communicating information with the VS, and the URL POS receives the payment request from the user, receives the vault URL from the URL medium through NFC, connects to the VS in response to the vault URL, delivers the vault URL, the payment request, and URL POS information to the VS corresponding to the vault URL, and delivers a payment result received from the VS to the user;

the VS is a server that has vault sites and includes a function of communicating information with the URL POS, a function of generating the payment command, and a function of communicating information with the URL vault account, and the VS connects to the URL POS in response to the vault URL, receives the vault URL, the payment request, and the URL POS information from the URL POS, generates the payment command in response to the payment request, delivers the payment command to the URL vault account corresponding to the vault URL, receives a payment command result from the URL vault account, and delivers the payment result corresponding to the payment command result to the URL POS;

the URL vault account is a device that holds money of the user and includes a function of communicating information with the VS and transferring money to the collection account, and the URL vault account receives the payment command from the VS, delivers the money in response to the payment command with the URL POS information to the collection account corresponding to the URL POS information, and transfers the payment command result to the VS; and the collection account is an account corresponding to the URL POS information, and the collection account collects the money from the URL vault account.

5. An online payment method that delivers money from an uniform resource locator (URL) vault account to a collection account in response to a payment command of a vault server (VS) receiving a payment request including URL medium information corresponding to a vault URL of a URL medium from a sales server (SS) after receiving a payment schedule of a user from a TD, the online payment method comprising:

the URL medium is a medium that stores the vault URL including ID of the user in a near field communication (NFC) chip to use an NFC and includes the URL medium information, and the URL medium delivers the vault URL to the TD through NFC during user check process and provides the URL medium information to the user during payment request process;

the TD is a terminal that has an NFC chip to receive the vault URL from the URL medium and includes a user interface (UI) function, a function of receiving the vault URL from the URL medium through NFC, a function of accessing the VS, a function of communicating a vault site or information with the VS, a function of accessing the SS, and a function of communicating a sales site or information with the SS, and the TD receives the vault URL from the URL medium through NFC, connects to the VS in response to the vault URL, communicates TD information and the vault site corresponding to the vault site with the VS or the user, delivers the user's vault URL password (PWD) to the VS through the vault site, delivers the VS's vault URL PWD check result to the user through the vault site, delivers the user's the payment schedule to the VS through the vault site, connects to the SS in response to the user's a SS access command, communicates the sales site with the SS or the user, delivers the user's payment request including the URL medium information to the SS through the sales site, and delivers a payment result of the VS or the SS to the user;

the VS is a server that has vault sites and includes a function of connecting to the TD, a function of communicating the vault site or information with the TD, a function of generating the vault URL PWD check result, a function of communicating information with the SS, a function of generating the payment command, and a function of communicating information with the URL vault account, and the VS connects to the TD in response to the vault URL, communicates the vault site and the TD information with the TD, receives the user's vault URL PWD through the vault site, checks the vault URL and the vault URL PWD and/or the TD information to generate the vault URL PWD check result, delivers the vault URL PWD check result to the user through the vault site, receives the user's the payment schedule through the vault site, connects to the SS in response to the URL medium information, receives the payment request and SS information from the SS, generates the payment command in response to the payment schedule and the payment request, delivers the payment command to the URL vault account corresponding to the vault URL, receives a payment command result from the URL vault account, and delivers the payment result corresponding to the payment command result to the SS or the TD;

the SS is a sales server for online payment that has sales sites and includes a function of connecting to the TD, a function of communicating the sales site or information with the TD, a function of including the URL medium information in the payment request, and a function of communicating information with the VS, and the SS connects to the TD in response to the SS access command of the user, communicate the sales site with the TD, receives the payment request including the URL medium information through the sales site, delivers the payment request and the SS information to the VS corresponding to the URL medium information, and delivers the payment result received from the VS to the TD;

the URL vault account is a device that holds money of the user and includes a function of communicating information with the VS and transferring money to the collection account, and the URL vault account receives the payment command from the VS, delivers the money in response to the payment command with the URL POS information to the collection account corresponding to the SS information, and transfers the payment command result to the VS; and the collection account is an account corresponding to the SS information and the collection account collects the money from the URL vault account.

6. An offline payment method that delivers money from an uniform resource locator (URL) vault-B account to a collection account-S in response to a payment command of a vault server (VS) receiving a vault URL-S of a URL medium-S after receiving a payment request corresponding to a vault URL-B of a URL medium-B from a terminal device (TD), the offline payment method comprising:

the URL medium-B is a medium that stores the vault URL-B including ID of a user-B in a near field communication (NFC) chip to use an NFC and the URL medium-B delivers the vault URL-B to the TD through NFC;

the URL medium-S is a medium that stores the vault URL-S including ID of a seller in an NFC chip to use an NFC and the URL medium-S delivers the vault URL-S to the TD through NFC;

the TD is a terminal that has an NFC chip to receive the vault URL from the URL medium and includes a user interface (UI) function, a function of receiving the vault URL-B from the URL medium-B through NFC, a function of accessing the VS, a function of communicating a vault site-B or information with the VS, a function of receiving the vault URL-S from the URL medium-S through NFC, and a function of delivering the vault URL-S to the VS, and the TD receives the vault URL-B from the URL medium-B through NFC, connects to the VS in response to the vault URL-B, communicates TD information and the vault site-B corresponding to the vault URL-B with the VS or the user-B, delivers the user-B's payment request to the VS through the vault site-B, receives the vault URL-S from the URL medium-S through NFC, delivers the vault URL-S to the VS, and delivers the VS's payment result to the user-B through the vault site-B;

the VS is a server that has vault sites and includes a function of connecting to the TD, a function of communicating the vault site-B and information with the TD, a function of receiving the vault URL-S from the TD, a function of generating the payment command, and a function of communicating information with the URL vault-B account, and the VS connects to the TD in response to the vault URL-B, communicates the vault site-B and the TD information with the TD, receives the user-B's payment request through the vault site-B, receives the vault URL-S from the TD, generates the payment command in response to the payment request and the vault URL-S, delivers the payment command to the URL vault-B account, receives a payment command result from the URL vault-B account, and delivers the payment result corresponding to the payment command result to the user-B through the vault site-B;

the URL vault-B account is a device that holds money of the user and includes a function of communicating information with the VS and transferring money to the collection account-S, and the URL vault-B account receives the payment command from the VS, delivers the money in response to the payment command with the URL POS information to the collection account-S corresponding to the vault URL-S, and transfers the payment command result to the VS; and the collection account-S is an account corresponding to the vault URL-S, and the collection account collects the money from the URL vault-B account.

* * * * *